(12) United States Patent
Ishikawa et al.

(10) Patent No.: US 10,563,870 B2
(45) Date of Patent: Feb. 18, 2020

(54) RADIATION HEATING DEVICE

(71) Applicant: DENSO CORPORATION, Kariya, Aichi-pref. (JP)

(72) Inventors: Kimitake Ishikawa, Kariya (JP); Hideaki Kako, Kariya (JP); Hiroyasu Oide, Kariya (JP); Hideki Seki, Kariya (JP); Yoshinobu Sumida, Kariya (JP); Yasuhiro Sagou, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 502 days.

(21) Appl. No.: 15/316,196

(22) PCT Filed: Jul. 7, 2015

(86) PCT No.: PCT/JP2015/003421
§ 371 (c)(1),
(2) Date: Dec. 5, 2016

(87) PCT Pub. No.: WO2016/013168
PCT Pub. Date: Jan. 28, 2016

(65) Prior Publication Data
US 2017/0321902 A1 Nov. 9, 2017

(30) Foreign Application Priority Data

Jul. 25, 2014 (JP) .................................. 2014-152199
Nov. 3, 2014 (JP) .................................. 2014-223865
Mar. 3, 2015 (JP) .................................. 2015-041659

(51) Int. Cl.
*H05B 3/20* (2006.01)
*F24C 7/04* (2006.01)
(Continued)

(52) U.S. Cl.
CPC ................. *F24C 7/04* (2013.01); *B60H 1/22* (2013.01); *F24D 13/02* (2013.01); *G06F 3/041* (2013.01); *H05B 3/20* (2013.01)

(58) Field of Classification Search
CPC .......... H05B 3/0042; H05B 3/06; H05B 3/26; H05B 3/267; H05B 2203/002;
(Continued)

(56) References Cited

U.S. PATENT DOCUMENTS 6,492,629 B1 * 12/2002 Sopory ................ H05B 1/0205
219/485
2011/0115404 A1 * 5/2011 Morgenbrod ............ G01J 1/32
315/291
(Continued)

FOREIGN PATENT DOCUMENTS

JP S63127032 A 5/1988
JP S6410033 A 1/1989
(Continued)

*Primary Examiner* — Brian W Jennison
(74) *Attorney, Agent, or Firm* — Harness, Dickey & Pierce, P.L.C.

(57) ABSTRACT

A radiation heating device includes: a planar heat generation layer; a heat generation portion that is provided in the heat generation layer and that generates heat by energization; a plurality of heat radiation portions that are disposed in the heat generation layer and that radiate heat transferred from the heat generation portion; a low heat conduction portion that is provided around each of the heat radiation portions and that has a lower heat conductivity than the heat radiation portions; and a contact detection unit that detects contact of an object with the heat generation layer. The radiation heating device further includes an energization amount decrease unit that decreases an energization amount of the heat generation portion when the contact detection unit detects the contact of the object with the heat generation layer.

15 Claims, 16 Drawing Sheets

(51) Int. Cl.
*B60H 1/22* (2006.01)
*F24D 13/02* (2006.01)
*G06F 3/041* (2006.01)

(58) Field of Classification Search
CPC ........ H05B 2203/003; H05B 2203/005; H05B 2203/007; H05B 2203/013; H05B 2203/014; H05B 2203/032; B60H 1/2215; B60H 1/2218; B60H 1/00021; B60H 1/00742; B60H 1/2225
See application file for complete search history.

(56) References Cited

U.S. PATENT DOCUMENTS

| | | | |
|---|---|---|---|
| 2012/0055914 A1* | 3/2012 | Goto | B60N 2/5685 |
| | | | 219/217 |
| 2012/0061365 A1* | 3/2012 | Okamoto | B60H 1/2225 |
| | | | 219/202 |
| 2012/0267354 A1 | 10/2012 | Okamoto et al. | |
| 2015/0110477 A1 | 4/2015 | Ota et al. | |
| 2016/0039265 A1 | 2/2016 | Ota et al. | |
| 2016/0059669 A1 | 3/2016 | Sagou et al. | |

FOREIGN PATENT DOCUMENTS

| | | |
|---|---|---|
| JP | H06341650 A | 12/1994 |
| JP | 2010052710 A | 3/2010 |
| JP | 2010111251 A | 5/2010 |
| JP | 2012056531 A | 3/2012 |
| JP | 2014000944 A | 1/2014 |
| JP | 2014003000 A | 1/2014 |
| WO | WO-2012004971 A1 | 1/2012 |

\* cited by examiner

POSITIVE TEMPERATURE COEFFICIENT
(PTC PROPERTIES)

NEGATIVE TEMPERATURE COEFFICIENT
(NTC PROPERTIES)

NEGATIVE TEMPERATURE COEFFICIENT
(CTR PROPERTIES)

LOW TEMP TIME

RADIATION HEATING DEVICE

CROSS REFERENCE TO RELATED APPLICATIONS

This application is a U.S. National Phase Application under 35 U.S.C. 371 of International Application No. PCT/JP2015/003421 filed on Jul. 7, 2015 and published in Japanese as WO 2016/013168 A1 on Jan. 28, 2016. This application is based on and claims the benefit of priority from Japanese Patent Application No. 2014-152199 filed on Jul. 25, 2014, Japanese Patent Application No. 2014-223865 filed on Nov. 3, 2014, and Japanese Patent Application No. 2015-041659 filed on Mar. 3, 2015. The entire disclosures of all of the above applications are incorporated herein by reference.

TECHNICAL FIELD

The present disclosure relates to a radiation heating device.

BACKGROUND ART

A conventional heater device includes plural heat radiation portions and plural heat generation portions. The heat generation portion is formed into a thin plate. The plural heat radiation portions are dispersed, and a low heat conduction portion is provided between the two adjacent heat radiation portions. The low heat conduction portion surrounds the entire periphery of the heat radiation portion, thereby thermally separating the plural heat radiation portions from each other (refer to, for example, Patent Literature 1).

PRIOR ART LITERATURES

Patent Literature

Patent Literature 1: JP 2014-3000 A

SUMMARY OF INVENTION

In the device described in Patent Literature 1, when an object contacts a surface of the device, heat of a specific heat radiation portion located immediately below the object is radiated to the object. Further, the low heat conduction portion inhibits heat from being transferred from the periphery of the specific heat radiation portion to the specific heat radiation portion. Thus, a temperature increase of the contact site of the device with the object is suppressed. For this reason, for example, when a human body contacts the heat radiation portion, the temperature of the surface of the heat radiation portion temporarily lowers. However, even in such a case, the heat generation portions remain energized, and the temperature of the surfaces of the heat radiation portions gradually rises. Accordingly, when the human body continuously contacts the heat radiation portion for a long time, the user feels thermally unconformable.

The present disclosure intends to provide a radiation heating device capable of reducing thermal discomfort felt by the human body that is in contact with the device.

According to an aspect of the present disclosure, a radiation heating device includes: a heat generation layer having a planar shape; a heat generation portion that is provided in the heat generation layer and that generates heat by energization; a plurality of heat radiation portions that are disposed in the heat generation layer and that radiate heat transferred from the heat generation portion; a low heat conduction portion that is provided around each of the heat radiation portions and that has a lower heat conductivity than the heat radiation portions; a contact detection unit that detects contact of an object with the heat generation layer; and an energization amount decrease unit that decreases an energization amount of the heat generation portion when the contact detection unit detects the contact of the object with the heat generation layer.

With such a configuration, the plurality of heat radiation portions that radiate heat transferred from the heat generation portion are disposed in the heat generation layer, and a low heat conduction portion having a lower heat conductivity than the heat radiation portions is provided around each of the heat radiation portions. Thus, when an object contacts the surface of the heat generation layer, heat of the heat radiation portion located close to a contact site of the heat generation layer with the object is radiated to the object, and the low heat conduction portion that encloses the heat radiation portion suppresses heat transfer to the heat radiation portion. As a result, the temperature of the contact site with the object can be rapidly lowered. When contact of the object with the heat generation layer is detected, the energization amount of the heat generation portion is decreased. For this reason, even when the contact with the object continues for a long time, an increase in the temperature of the heat generation layer is suppressed. This can suppress the temperature of the heat generation layer from increasing when the human body contacts the heat generation layer, thereby reducing thermal discomfort of the human body.

BRIEF DESCRIPTION OF DRAWINGS

The above and other objects, features and advantages of the present disclosure will become more apparent from the following detailed description made with reference to the accompanying drawings.

DESCRIPTION OF EMBODIMENTS

Figure 1:
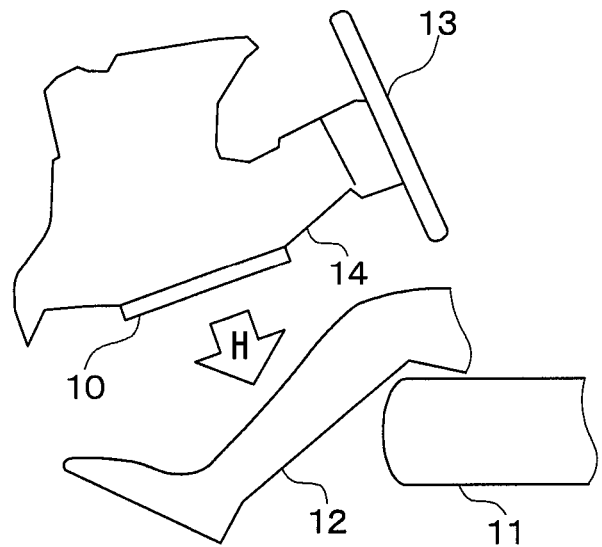
FIG. 1 is a view illustrating a heater device according to a first embodiment.

Hereinafter, embodiments will be described according to the drawings. Same or equivalent portions among respective embodiments below are labeled with same reference numerals in the drawings.

First Embodiment

The first embodiment will be described below with reference to FIG. 1 to FIG. 8. As illustrated in FIG. 1, a radiation heating device 10 in the first embodiment is installed in the interior of a vehicle travelling on a road. The heater device 10 constitutes a part of an indoor heating system. The heater device 10 is an electric heater that receives power from a power source such as a battery and a generator in the vehicle to generate heat. The heater device 10 is formed into a thin plate. In order to heat an object located vertical to the surface of the heater device 10, the heater device 10 radiates radiant heat H mainly in the direction vertical to the surface.

A seat 11 on which a passenger 12 sits is installed in the interior of the vehicle. The heater device 10 is disposed in the interior to radiate radiant heat H to feet of the passenger 12. The heater device 10 can be used to quickly heat the passenger 12, for example, immediately after activation of another heating system. The heater device 10 is installed opposed to the passenger 12 in an assumed normal position. For example, the vehicle includes a steering column 14 that supports a steering wheel 13. The heater device 10 may be disposed on the underside of the steering column 14 as opposed to the passenger 12.

Figure 2:
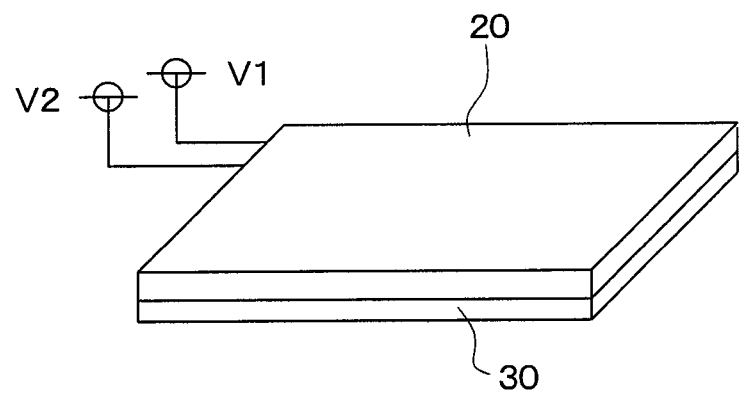
FIG. 2 is a view illustrating a configuration of the heater device of the first embodiment.

FIG. 2 illustrates configuration of the heater device 10 in the present embodiment. The heater device 10 includes a heat generation layer 20 and a contact detection layer 30 that detects contact of an object with the heat generation layer 20. The heat generation layer 20 and the contact detection layer 30 overlap each other. The contact detection layer 30 is a layered member that covers the planar heat generation layer 20.

Figure 3:
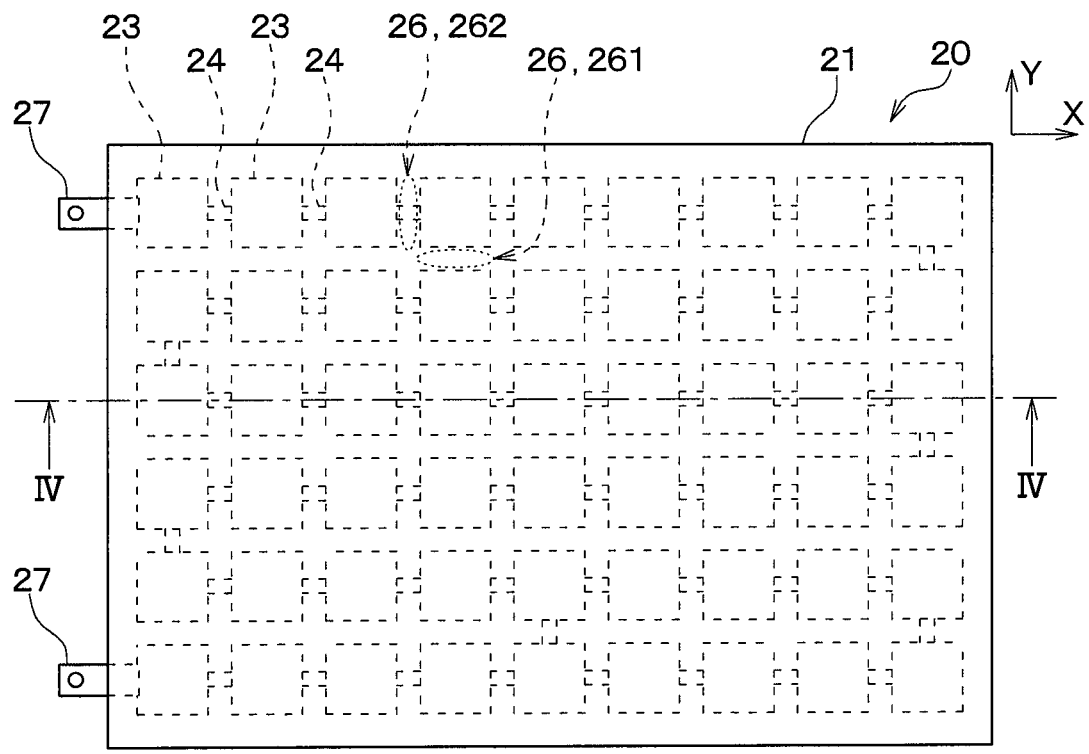
FIG. 3 is a view illustrating a configuration of a heater unit.
Figure 4:
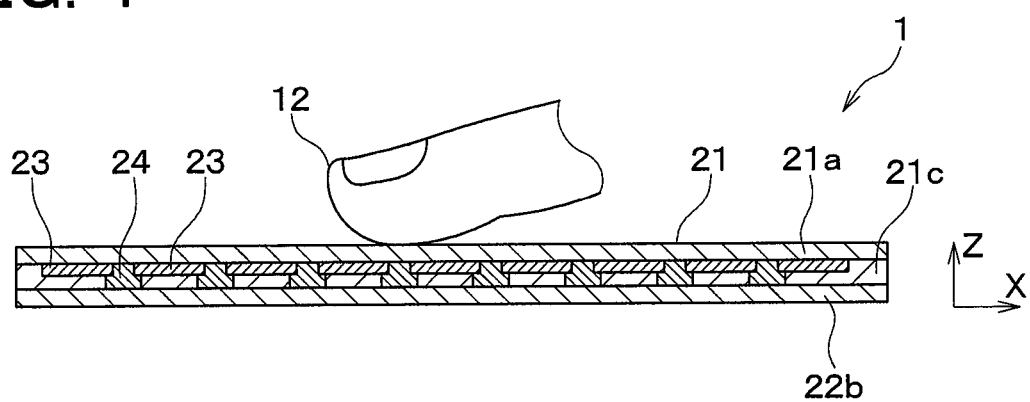
FIG. 4 is sectional view taken along a line IV-IV in FIG. 3.

FIG. 3 and FIG. 4 illustrate the heat generation layer 20. FIG. 4 illustrates the cross section of the heat generation layer 20 taken along a line IV-IV in FIG. 3. FIG. 3 and FIG. 4 do not illustrate the contact detection layer 30. The heat generation layer 20 extends along an X-Y plane defined by an axis X and an axis Y. The heat generation layer 20 has a thickness along an axis Z. The heat generation layer 20 is formed into a substantially rectangular thin plate. The heat generation layer 20 include a substrate 21, a plurality of heat radiation portions 23, a plurality of heat generation portions 24, and a pair of terminals 27. The heat generation layer 20 can be referred to as a planar heater that radiates radiant heat R in a direction vertical to the surface of the heater.

The substrate 21 is made of a resin material having excellent electrical insulation and resistance to higher temperatures. The substrate 21 is a multi-layered substrate. The substrate 21 has a front face layer 21a, a rear face layer 21b, and an intermediate layer 21c. The front face layer 21a is oriented in a radiation direction of the radiant heat R. In other words, in installing the heat generation layer 20, the front face layer 21a is opposed to a portion of the passenger 12 to be heated. The rear face layer 21b is located on the rear face side of the heat generation layer 20. The rear face layer 21b is in contact with the contact detection layer 30. The intermediate layer 21c supports the heat radiation portions 23 and the heat generation portions 24. The substrate 21 serves to support the plurality of heat radiation portions 23.

The plurality of heat radiation portions 23 each are made of a material having a high heat conductivity. Further, the heat radiation portions 23 each are formed of an excellent electric conductor, that is, is made of a material having a low electric resistance. The heat radiation portions 23 may be made of a metal material.

Each of the heat radiation portions 23 is formed into a thin plate located in parallel to the face of the substrate 21. One heat radiation portion 23 can radiate radiant heat R generated by heat supplied through energization. One heat radiation portion 23 is heated to a predetermined radiation temperature, thereby radiating radiant heat R that gives warmness to the passenger 12, that is, a person. The volume of one heat radiation portion 23 is set such that the heat radiation portion 23 can reach a temperature at which the heat radiation portion 23 can radiate radiant heat R by heat supplied from the heat generation portion 24. The volume of one heat radiation portion 23 is set such that the temperature of the heat radiation portion 23 is rapidly increased by heat supplied from the heat generation portion 24. The volume of one heat radiation portion 23 is set small so as to cause a rapid temperature drop by heat radiated to the object that is in contact with the surface of the heat generation layer 20.

The thickness of one heat radiation portion 23 is small so as to maximize its area parallel to the surface and minimize its volume. The area of one heat radiation portion 23 is set to be suitable for radiating radiant heat R. The area of one heat radiation portion 23 is set to be smaller than a portion of the object such as the passenger 12, which is located opposed to the surface of the heat generation layer 20.

The one heat radiation portion 23 in the present embodiment is rectangular on the X-Y plane. When energized, the heat radiation portion 23 itself generates no radiant heat R that gives warmness to the passenger 12. The heat radiation portion 23 is a member that does not generate heat but radiate heat.

The plurality of heat radiation portions 23 are dispersed with respect to the surface of the substrate 21. In other words, the plurality of heat radiation portions 23 are dispersed on the face where radiant heat R is radiated. The plurality of heat radiation portions 23 are disposed so as not to overlap one another. The plurality of heat radiation portions 23 are separated from one another. The plurality of heat radiation portions 23 are regularly arranged so as to occupy a predetermined area of the X-Y plane in the figures. The plurality of heat radiation portions 23 may be referred to as a heat radiation portion array. The plurality of heat radiation portions 23 are arranged to form a grid n×n with respect to the surface of the substrate 21. The plurality of heat radiation portions 23 are distributed with respect to the surface of the substrate 21. The plurality of heat radiation portions 23 are aligned on one or more energization paths each formed between the pair of terminals 27. In the illustrated example, the plurality of heat radiation portions 23 are aligned on the meandering energization path.

The plurality of heat radiation portions 23 are embedded in the substrate 21. Specifically, the plurality of heat radiation portions 23 are disposed between the front face layer 21a and the intermediate layer 21c. Thus, the plurality of heat radiation portions 23 are not exposed on the surface of the substrate 21. The plurality of heat radiation portions 23 is protected by the substrate 21.

The plurality of heat generation portions 24 each are made of a material that generate heat by energization. The heat generation portions 24 may be made of a metal material. Like the plurality of heat radiation portions 23, the plurality of heat generation portions 24 are dispersed with respect to the surface of the substrate 21.

The heat generation portion 24 is disposed between the two adjacent heat radiation portions 23, 23, and is connected to the two adjacent heat radiation portions 23, 23. Thus, the heat generation portion 24 is thermally connected to the heat radiation portions 23, and generates heat by energization. The heat generation portion 24 is thermally connected to the heat radiation portions 23. Accordingly, heat generated by the heat generation portion 24 is directly transferred to the directly-connected to the heat radiation portions 23. Heat generated by the one heat generation portion 24 is transferred to other heat radiation portions 23 located away from the one heat generation portion 24 via the member such as the substrate 21. Further, the heat generation portion 24 is electrically connected to the heat radiation portions 23. At least two heat generation portions 24 are connected to one heat radiation portion 23. The plurality of heat generation portions 24 and the plurality of heat radiation portions 23 form a series of energization paths between the pair of terminals 27.

In order to concentrate a current, the heat generation portions 24 each are formed to have a small sectional area in the energization direction. In order to suppress heat transfer between two adjacent heat radiation portions 23, the heat generation portion 24 is formed to decrease the sectional area between the two adjacent heat radiation portions 23. In the illustrated example, the heat generation portion 24 is thicker than the heat radiation portion 23. However, the width of the heat generation portion 24 is smaller than the width of the heat radiation portion 23 in the X-Y plane. The width of the heat generation portion 24 is smaller than a half of the width of the heat radiation portion 23 in the X-Y plane. In order to acquire a predetermined heating value, the length of the heat generation portion 24 is set to have a predetermined length. Further, in order to suppress heat transfer between the two adjacent heat radiation portions 23, the length of the heat generation portion 24 is set long. As a result, the heat generation portion 24 is long in the X-Y plane.

The one heat generation portion 24 in the present embodiment fills the portion between two adjacent heat radiation portions 23, 23, and is also located below the two adjacent heat radiation portions 23, 23. The heat generation portions 24 also radiate radiant heat R. However, since the area of the heat generation portion 24 in the X-Y plane is small, the amount of radiant heat R is small. The heat generation portion 24 is a member that serves to generate heat and radiate heat.

The number of heat radiation portions 23 is equal to the number of heat generation portions 24. As a result, the almost same heating value as the heating value generated by one heat generation portions 24 is supplied to the one heat radiation portion 23. Heat that is generated by one heat generation portions 24 and supplied to the heat radiation portions 23 is set such that the temperature of one corresponding heat radiation portion 23 reaches the radiation temperature.

A low heat conduction portion 26 that suppresses heat transfer is provided between two adjacent heat radiation portions 23. The low heat conduction portion 26 is made of mainly a material for the substrate 21. The low heat conduction portion 26 encloses the entire periphery of one heat radiation portion 23 in the X-Y plane. The low heat conduction portion 26 that encloses one heat radiation portion 23 suppresses heat from entering into the heat radiation portion 23 from surroundings. All of the heat radiation portions 23 are enclosed with the low heat conduction portion 26 in entire periphery. The low heat conduction portions 26 enclose the entire peripheries of all heat radiation portions 23 to provide thermal barriers between the plurality of heat radiation portions 23. The low heat conduction portions 26 thermally separate the plurality of heat radiation portions 23 from one another.

The low heat conduction portion 26 that encloses specific one heat radiation portion 23 suppresses heat transfer to the specific heat radiation portion 23 from surroundings of the specific heat radiation portion 23. A specific heat radiation portion group can be assumed above the heat generation layer 20. The specific heat radiation portion group is a group of a plurality of heat radiation portions 23 located together. In this case, the low heat conduction portion 26 that encloses the specific heat radiation portion group suppresses heat transfer to the specific heat radiation portion group from the surroundings of the specific heat radiation portion group.

In the present embodiment, since the heat radiation portion 23 is rectangular, the low heat conduction portion 26 is disposed on four sides of the heat radiation portion 23. A first low heat conduction portion 261 having only the substrate 21 is formed on at least one side of one heat radiation portion 23. The first low heat conduction portions 261 are formed on at least two sides of one heat radiation portion 23. A second low heat conduction portion 262 having the substrate 21 and the heat generation portion 24 is formed on at least one side of one heat radiation portion 23. The second low heat conduction portion 262 is formed on at least one side of one heat radiation portion 23. When four sides of the heat radiation portion 23 are enclosed with other heat radiation portions 23, two first low heat conduction portions 261 and two second low heat conduction portion 262 enclose the heat radiation portion 23.

Figure 5:
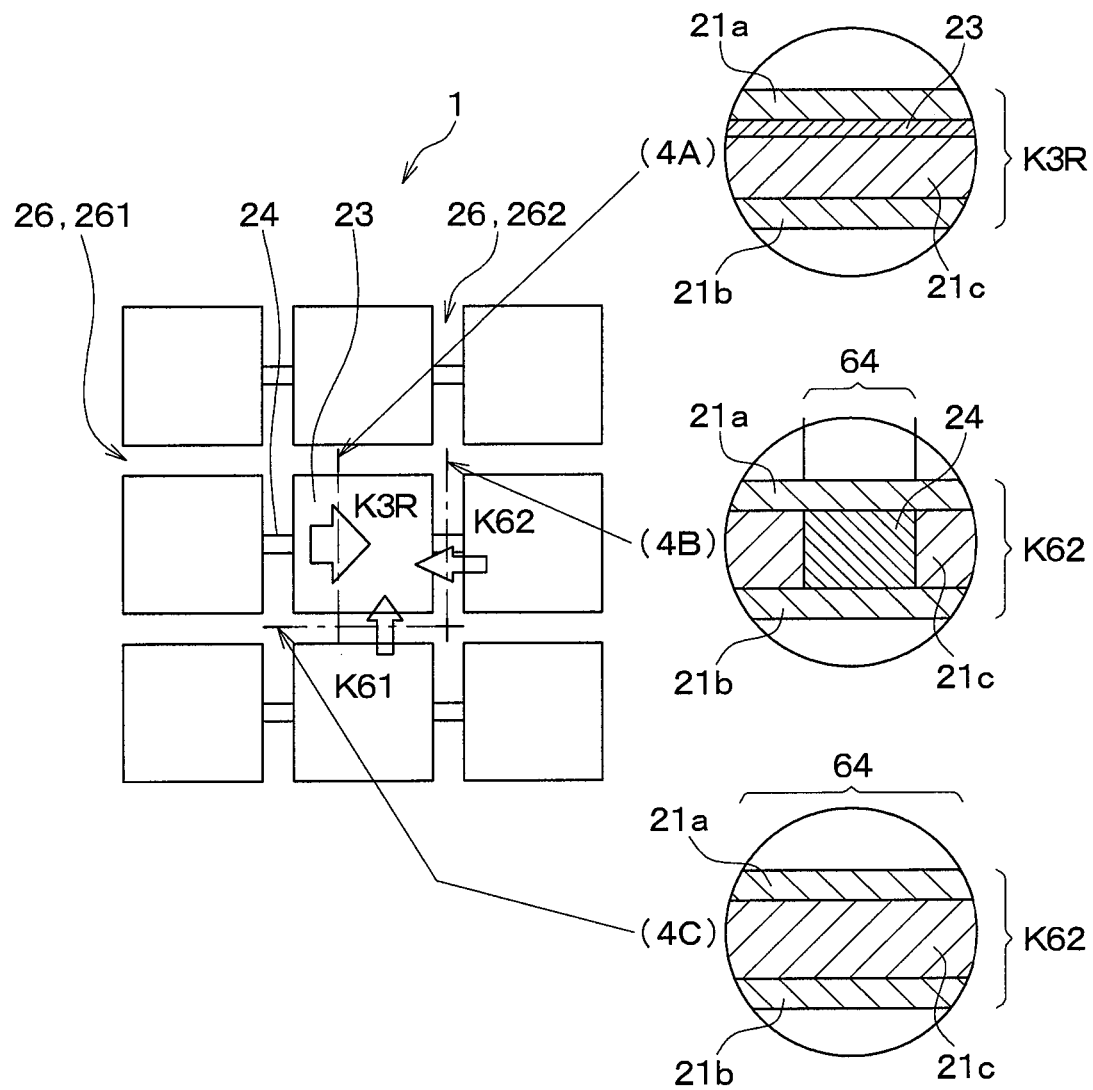
FIG. 5 is a view for describing a heat transfer path of the heater unit.

FIG. 5 illustrates a cross section (4A) of one heat radiation portion 23, and cross sections (4B), (4C) around the heat radiation portion 23. Directions of main heat transfer are represented by arrows in the figure. The first low heat conduction portion 261 viewed along the cross section (4C) is constituted of only materials 21a, 21b, and 21c constituting the substrate 21. Thus, an average heat conductivity K61 of the first low heat conduction portion 261 can be found based on the heat conductivity of the substrate 21. The second low heat conduction portion 262 viewed along the cross section (4B) is constituted of the materials 21a, 21b, and 21c constituting the substrate 21, and the heat generation portion 24. Thus, an average heat conductivity K62 of the second low heat conduction portion 262 can be found based on the heat conductivity of the substrate 21 and the heat conductivity of the heat generation portion 24. An average heat conductivity K3R viewed along the cross section (4A) that is the cross section of the heat radiation portion 23 can be found based on the heat conductivity of the substrate 21 and the heat conductivity of the heat radiation portions 23.

A heat conductivity K2 of a resin material forming the substrate 21 is much lower than a heat conductivity K3 of a material forming the heat radiation portion 23 and a heat conductivity K4 of a material forming the heat generation portion 24. That is, K2 is much lower than K3, and K2 is much lower than K4. The heat conductivity K4 of the material forming the heat generation portion 24 is lower than the heat conductivity K3 of the material forming the heat radiation portion 23. That is, K4 is smaller than K3. The heat conductivity K62 is higher than the heat conductivity K61. That is, K61 is smaller than K62. However, the heat conductivity K3R is much higher than the heat conductivity K61 and the heat conductivity K62. That is, K61 is much lower than K3R, and K62 is much lower than K3R.

The four sides of the heat radiation portion 23 are enclosed with two first low heat conduction portions 261 and two second low heat conduction portion 262. Thus, an average heat conductivity KP of the entire periphery enclosing the heat radiation portion 23 is KP=2·K61+2·K62. In the present embodiment, material and size are set such that KP is lower than K3R. That is, the average heat conductivity K3R in the cross section (4A) across the heat radiation portions 23 is higher than the heat conductivity KP of the entire periphery enclosing the heat radiation portions 23.

With this configuration, heat is rapidly transferred in the cross section including the heat radiation portion 23. Thus, the temperature of one heat radiation portion 23 can rapidly rise and lower. When no object contacts the surface of the heat generation layer 20, the heating value of the heat generation portion 24 is set to achieve the predetermined radiation temperature on the surface of the front face layer 21a of the heat radiation portion 23. This radiates radiant heat R that gives warmness to the passenger 12. The heating value of the heat generation portion 24 can be adjusted using material, size, and current value of the heat generation portion 24. When energization of the heat generation layer 20 is started, the temperature of the surface of the heat generation layer 20 rapidly rises to the predetermined radiation temperature. Thus, even during wintertime, the passenger 12 can rapidly feel warmness.

Figure 6:
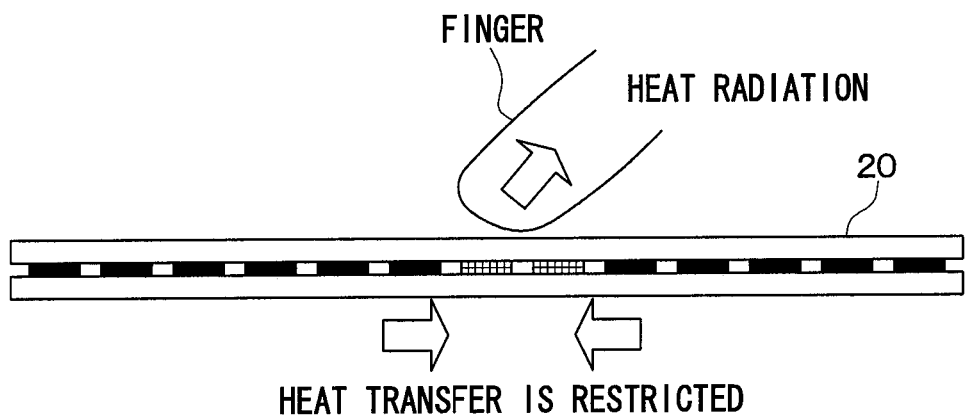
FIG. 6 is a view for describing the heater unit of the heater device in accordance with the first embodiment.

When an object contacts the surface of the heat generation layer 20 above one specific heat radiation portion 23, as illustrated in FIG. 6, heat of the specific heat radiation portion 23 is rapidly transferred to the contacting object. As a result, the temperature of the specific heat radiation portion 23 rapidly lowers. Thus, the temperature of the surface of the heat generation layer 20 that is in contact with the object rapidly lowers. Heat of the specific heat radiation portion 23 is transferred to the contacting object, and is dispersed to the contacting object. This prevents the temperature of the surface of the contacting object from excessively rising.

Figure 7:
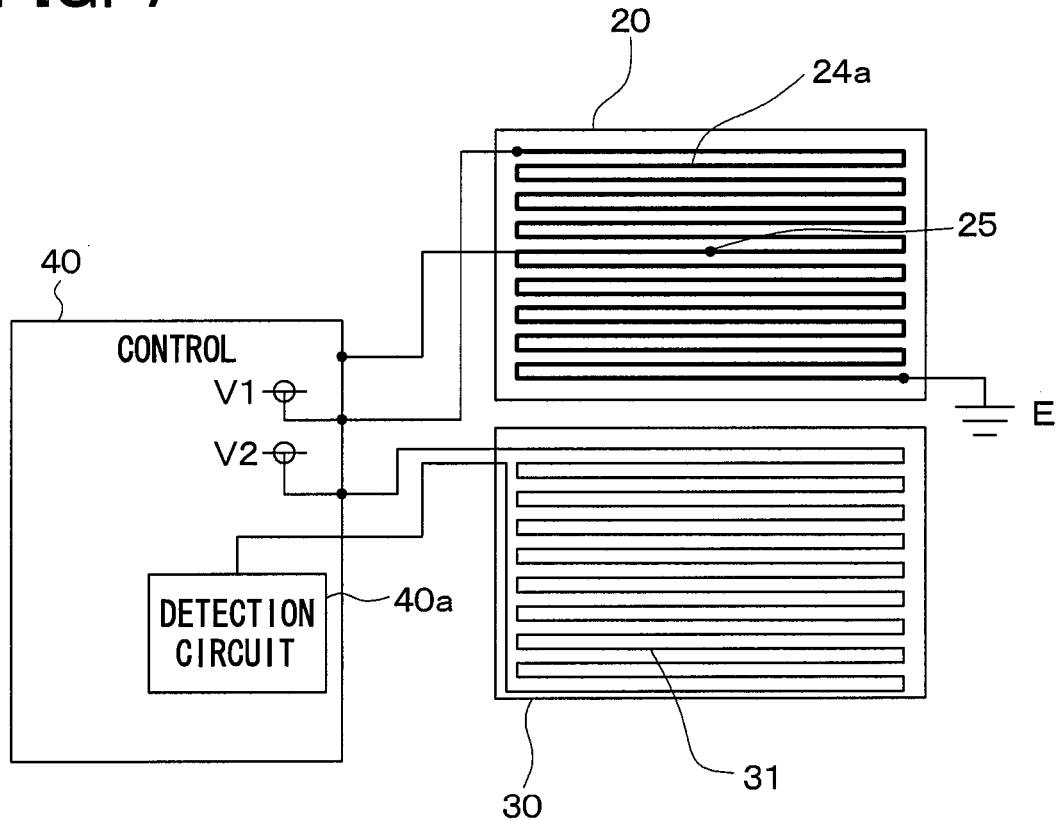
FIG. 7 is a view illustrating a configuration of the heater device in accordance with the first embodiment.

As illustrated in FIG. 7, the heater device 10 includes an energization path 24a provided in the heat generation layer 20, a resistor 31 provided on the contact detection layer 30, a heat control temperature sensor 25, and a control unit 40. The energization path 24a is configured of the heat generation portions 24 and the heat radiation portions 23. In the heater device 10, the heat generation portions 24 in the planar heat generation layer 20 are energized to radiate radiant heat.

The meandering energization path 24a is formed in the heat generation layer 20. A uniform voltage V1 is applied to the heat generation portions 24 constituting the energization path 24a according to control of the control unit 40. When the uniform voltage V1 is applied to the heat generation portions 24 according to control of the control unit 40, the heat generation portions 24 starts to generate heat, and rises in temperature, generating radiant heat.

The resistor 31 that detects a temperature change of the heat generation layer is disposed in the contact detection layer 30. A resistance value of each resistor 31 changes with a temperature change. The resistor 31 forms a meandering pattern on the contact detection layer 30. The resistors 31 are formed on a face of the contact detection layer 30 on the opposite side to the heat generation layer 20. The resistors 31 have the almost same temperature as the heat generation layer 20. The resistors 31 can detect a temperature change of a predetermined area of the planar heat generation layer 20, that is, the entire area of the heat generation layer 20 where the heat generation portions 24 are arranged. The resistors 31 can also detect local abnormal heat generation at plural positions of the planar heat generation layer 20. The resistor 31 is a temperature detection unit that detects a temperature change of the heat generation layer 20.

Figure 8:
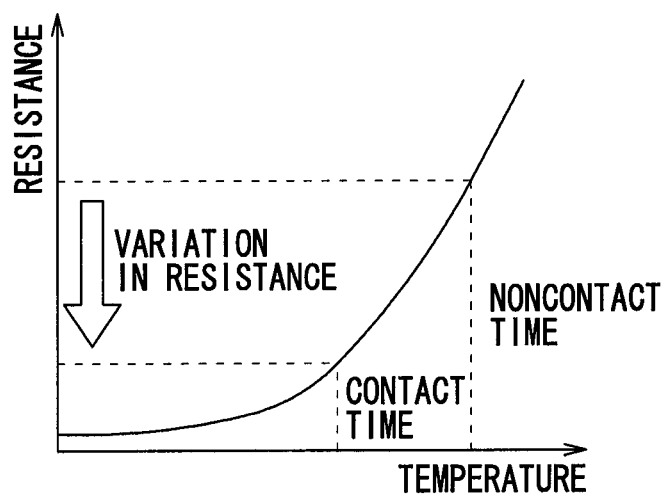
FIG. 8 is a view for describing temperature characteristics of resistors in a contact detection layer.

FIG. 8 illustrates relationship between temperature and resistance value of the resistor 31. The resistors 31 each have a positive temperature characteristic. It is apparent that the resistance value of each resistor 31 increases with a rise of temperature of the resistor 31. That is, when the temperature of the resistor 31 formed on the contact detection layer 30 lowers due to contact of an object with the heat generation layer 20, the resistance value of the resistor 31 decreases. The heater device 10 detects the contact of the object on the basis of the change of the resistance value of the resistor 31.

The heat control temperature sensor 25 is provided in the heat generation layer 20, detects the temperature, for example, at the center of the heat generation layer 20, and outputs a signal indicating the detected temperature to the control unit 40. The heat control temperature sensor 25 corresponds to a heat generation layer temperature detection unit.

The control unit 40 is configured of a microcomputer including CPU, ROM, RAM, I/O, and so on, and the CPU executes various processing according to a program stored in the ROM.

The control unit 40 includes a detection circuit 40a that outputs a voltage responsive to a current flowing to the resistors 31. The control unit 40 determines contact of an object with the heat generation layer 20 on the basis of an output voltage of the detection circuit 40a. The detection circuit 40a is a contact detection unit that detects contact of the object with the contact detection layer 30.

Figure 9:
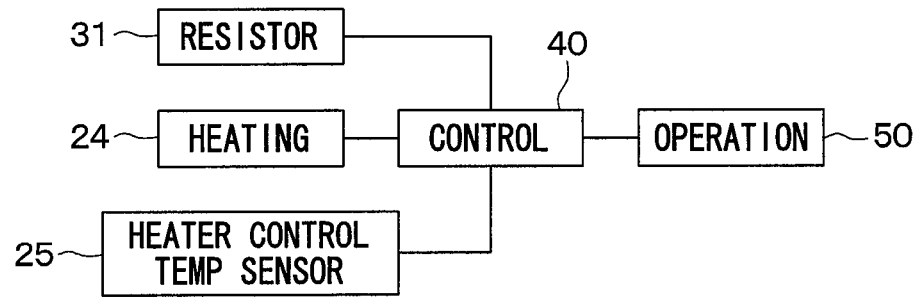
FIG. 9 is a block diagram of the heater device in accordance with the first embodiment.

FIG. 9 is a block diagram of the heater device 10. The heater device 10 includes the resistor 31 formed on the contact detection layer 30, the heat generation portion 24 that generates heat and radiate radiant heat, the heat control temperature sensor 25 that detects temperature of the heat generation layer 20, the control unit 40 that performs various types of control, and the operation unit 50 that operates the heater device 10.

The operation unit 50 includes a switch that operates the heater device 10. The user can operate the operation unit 50, thereby turning on/off the heater device 10 and setting a setting temperature. When the operation unit 50 is operated, a signal corresponding to the operation is outputted to the control unit 40.

When determining contact of the object on the basis of the resistance value of the resistor 31 formed on the contact detection layer 30, the control unit 40 of the heater device 10 executes processing of decreasing the energization amount of the heat generation portions 24.

Figure 10:
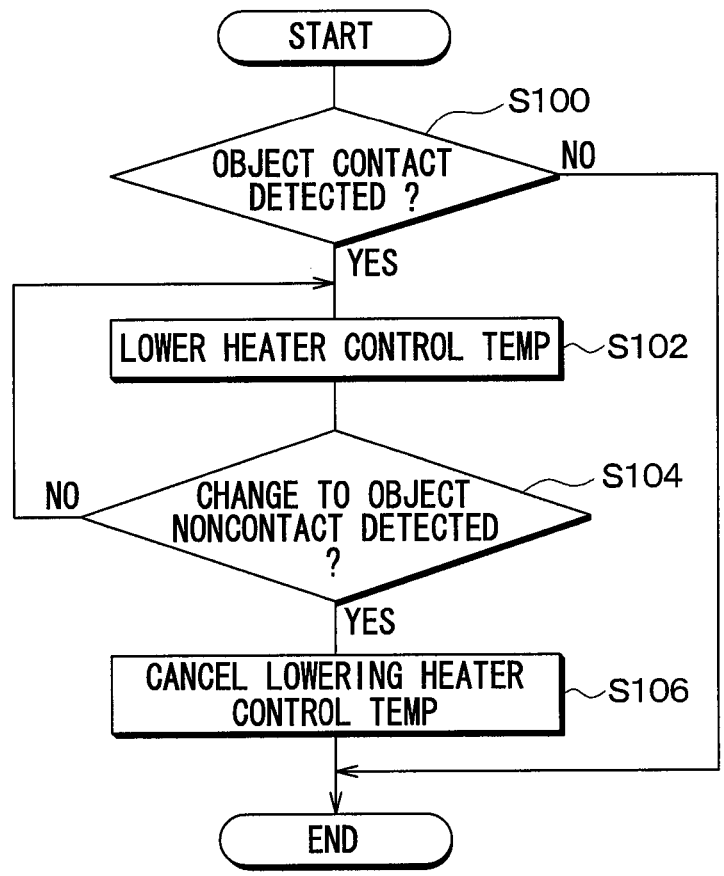
FIG. 10 is a flowchart of a control unit of the heater device in accordance with the first embodiment.

FIG. 10 is a flowchart of the processing. When the heater device 10 is activated in accordance with the user's operation of the operation unit 50, the control unit 40 sets a heater control temperature to the setting temperature set by the user, energizes the heat generation portions 24 such that the temperature detected by the heat control temperature sensor 25 gets close to the heater control temperature, and periodically executes the processing illustrated in FIG. 10.

First, it is determined whether contact of an object with the heat generation layer 20 is detected (S100). That is, it is determined whether direct contact of an object with the heat generation layer 20, or contact of an object with the heat generation layer 20 via the contact detection layer 30 is detected. Specifically, it is determined whether or not contact of an object is detected based on the output voltage of the detection circuit 40a. Here, when the contact of the object with the contact detection layer 30 is absent, NO is selected in S100 to finish the processing.

Figure 11:
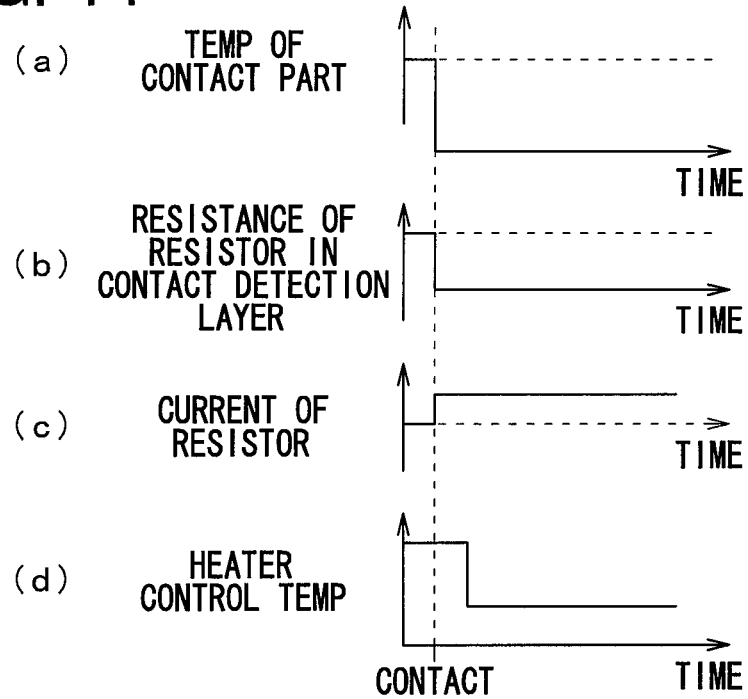
FIG. 11 is a view for describing, at contact of a human body with a contact detection layer or a heat generation layer, temperature of a contact site, a resistance value of a resistor, a current flowing to the resistor, and heater control temperature.

For example, when a human body contacts the contact detection layer 30 or the heat generation layer 20 and as illustrated in (a) of FIG. 11, the temperature of the contact site lowers, the resistance value of the resistor 31 formed on the contact detection layer 30 decreases as illustrated in (b) of FIG. 11, and a current passing through the resistor 31 increases as illustrated in (c) of FIG. 11. Then, when the voltage outputted from the detection circuit 40a becomes a first threshold or more, YES is selected in S100, and the heater control temperature is lowered as illustrated in (d) of FIG. 11 (S102). Specifically, it is controlled to reduce the energization amount of the heat generation portions 24. This decreases the heating value generated by the heat generation portions 24. In the present embodiment, components (software, hardware, or the like) of the control unit 40, which perform S102, constitute an energization amount decrease unit.

Next, it is determined whether or not the contact state of the object is released (S104). Specifically, it is determined whether or not contact of the object with the contact detection layer 30 is canceled.

Here, when the human body continues to contact the contact detection layer 30 or the heat generation layer 20, NO is selected in S104 and the procedure returns to S102. Therefore, the heating value generated by the heat generation portions 24 remains decreased. In this manner, the temperatures of the heat generation layer 20 and the contact detection layer 30 lower to a predetermined temperature.

When contact of the human body with the contact detection layer 30 or the heat generation layer 20 is released, YES is selected in S104, and the lowering of the heater control temperature is cancelled (S106). Specifically, the energization amount of the heat generation portions 24 is controlled to return to the original energization amount to finish the processing. Accordingly, radiant heat radiated from the heat generation portions 24 increases, and returns to the original heating value.

A conventional heater device includes a high-temperature radiant heater at an opening of a body, and further includes an infrared light emitting diode and a phototransistor on a front face of the opening. When the infrared light emitting diode and the phototransistor detect that an object approaches, energization to the heater is turned off (for example, JP H06-341650 A). Such a heater device radiates high-temperature radiant heat, and detects that the object approaches. However, with such a heater device, even when the object does not directly contact the heater, it is detected that the object approaches and energization of the heater is turned off.

On the contrary, with the heater device 10, the plurality of heat radiation portions 23 that radiate heat transferred from the heat generation portions 24 are dispersed in the heat generation layer 20, and the low heat conduction portion 26 having a lower heat conductivity than the heat radiation portions 23 encloses each of the heat radiation portions 23. When an object contacts the surface of the heat generation layer 20, heat of the heat radiation portions 23 located close to the contact site with the object is radiated to the object, and the low heat conduction portion 26 that encloses the heat radiation portions 23 suppresses heat transfer to the heat radiation portions 23, rapidly lowering the temperature of the contact site with the object.

That is, with the heater device 10, the plurality of heat radiation portions 23 that radiate heat transferred from the heat generation portions 24 are disposed in the heat generation layer 20, and the low heat conduction portion 26 having a lower heat conductivity than the heat radiation portions is provided around each of the heat radiation portions 23. Thus, when an object contacts the surface of the heat generation layer 20, heat of the heat radiation portion 23 located close to the contact site of the heat generation layer with the object is radiated to the object, and the low heat conduction portion 26 that encloses the heat radiation portions 23 suppresses heat transfer to the heat radiation portions 23. As a result, the temperature of the portion that contacts the object can be rapidly lowered. Further, when the contact of the object with the heat generation layer 20 is detected, the energization amount of the heat generation portions 24 is decreased. Thus, even when the contact with the object continues for a long time, an increase in the temperature of the heat generation layer is suppressed. This can prevent the temperature of the heat generation layer from increasing when a human body contacts the heat generation layer, to reduce thermal discomfort of the human body.

The resistors 31 that detect a temperature change of the heat generation layer 20 are also provided. A temperature drop of the heat generation layer 20, which is detected using the resistors 31, is regarded as the contact of the object with the heat generation layer 20. That is, the contact with the object can be accurately detected based on the temperature drop of the heat generation layer 20, which is caused by the contact with the object.

The resistors 31 are provided on the contact detection layer 30 disposed so as to cover the predetermined area of the planar heat generation layer 20, to detect a temperature change of the area.

Second Embodiment

A heater device 10 in the present embodiment has the same configuration as the heater device 10 in the first embodiment. The heater device 10 in the first embodiment lowers the heater control temperature when contact with an object is detected in S100. On the contrary, the heater device 10 in the present embodiment lowers the heater control temperature when contact with the object for a certain time period or more is detected.

Figure 12:
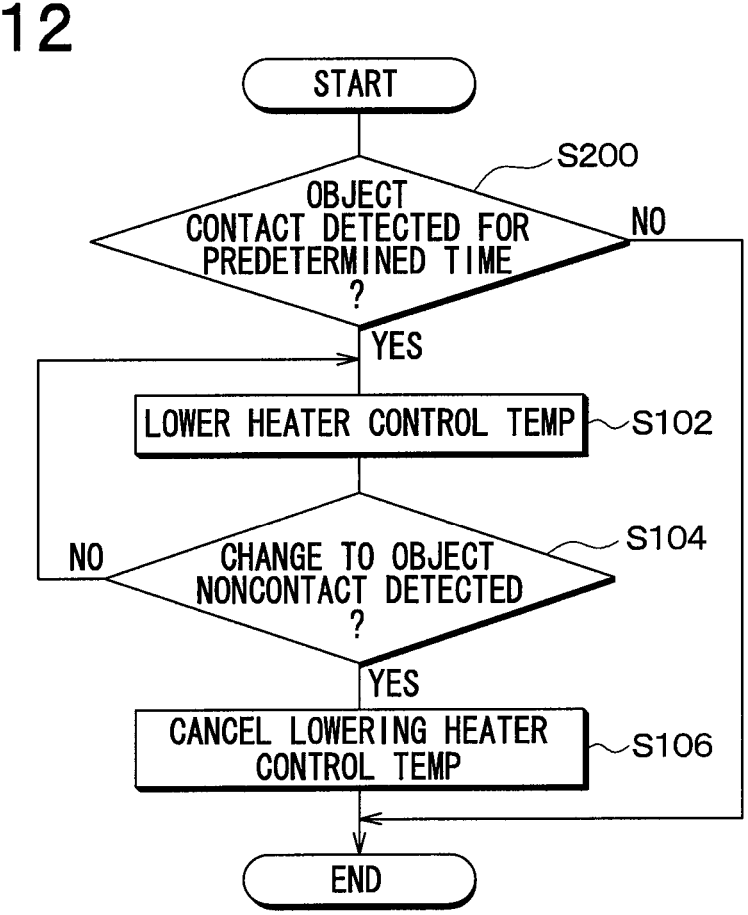
FIG. 12 is a flowchart of the control unit of the heater device in accordance with a second embodiment.

FIG. 12 is a flowchart of the control unit 40 of the heater device 10 in the present embodiment. When the heater device 10 is activated in accordance with the user's operation of the operation unit 50, the control unit 40 determines whether or not contact with the object for a certain time period or more is detected. Here, the certain time period is set to a time elapsed until the user feels thermal discomfort after contact with the heat generation portion 24. Specifically, it is determined whether or not contact with the object for the certain time or more is detected based on an output signal of the detection circuit 40*a*. Here, when the contact of the object with the contact detection layer 30 is absent, NO is selected in S100 to finish the processing.

For example, when an object contacts the contact detection layer 30 or the heat generation layer 20 for the certain time or more, YES is selected in S200 and then, the heater control temperature is lowered (S102). Specifically, it is controlled to reduce the energization amount of the heat generation portions 24. This decreases the heating value generated by the heat generation portions 24.

In the case where the heater temperature is lowered when the object contacts only for a short time, the heating value of radiant heat may decrease to cause the user to feel disorder. However, by lowering the heater temperature when contact with the object for the certain time or more is detected as in the present embodiment, heating disorder to give thermal discomfort to the user does not occur.

Third Embodiment

A heater device 10 in the present embodiment has the same configuration as the heater device 10 in the first embodiment. The control unit 40 of the heater device 10 in the present embodiment determines whether or not local abnormal heat generation of the heater is detected using the resistor 31 that changes in resistance value according to a temperature change, and executes processing of deactivating the heater when the local abnormal heat generation is detected.

Figure 13:
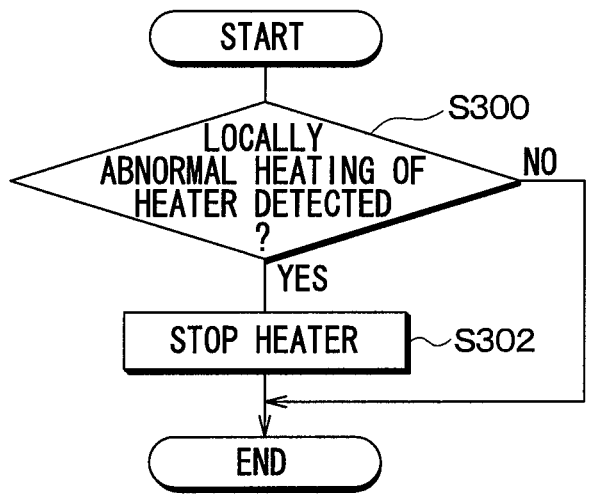
FIG. 13 is a flowchart of a control unit of a heater device in accordance with a third embodiment.

FIG. 13 is a flowchart of the control unit 40 of the heater device 10 in the present embodiment. When the heater device 10 is activated in accordance with the user's operation of a switch of the operation unit 50, the control unit 40 periodically executes processing illustrated in FIG. 13 in addition to the processing illustrated in FIG. 10.

First, it is determined whether or not local abnormal heat generation caused by any cause of the heater is detected (S300). Specifically, it is determined whether or not local abnormal heat generation of the heater is detected based on whether or not the output voltage of the detection circuit 40*a* is a second threshold or more. The second threshold is smaller than the first threshold used in S100. Here, when the output voltage of the detection circuit 40*a* is the second threshold or more, NO is selected in S300 to finish the processing.

Figure 14:
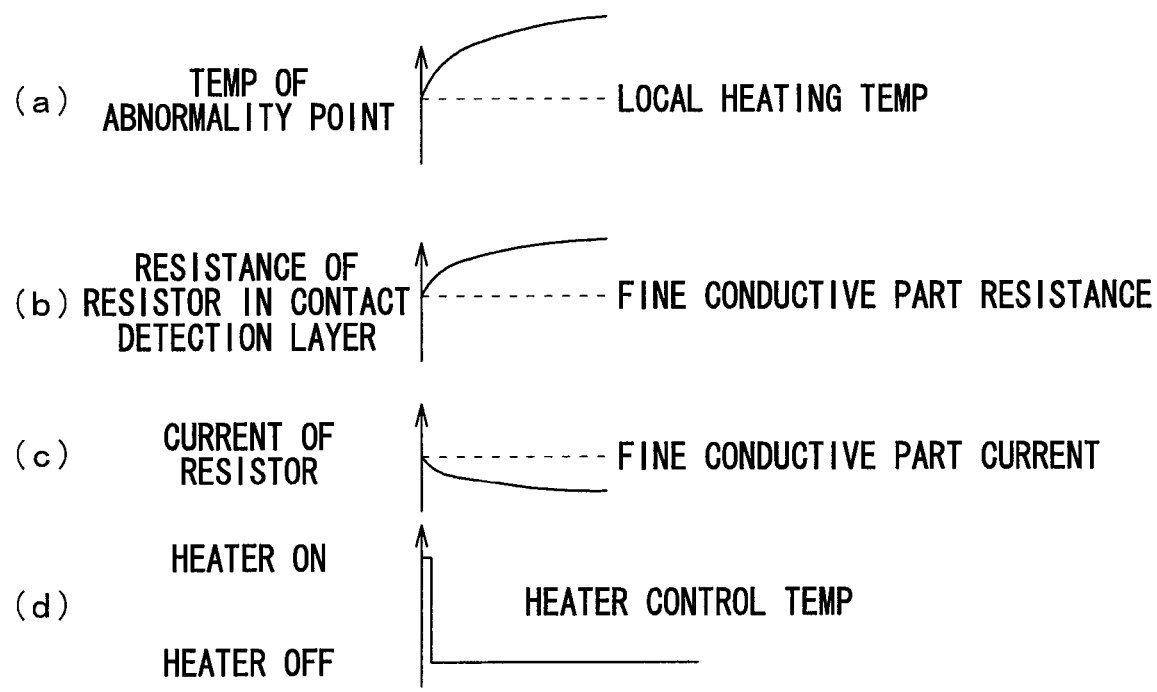
FIG. 14 is a view for describing, at damage of a portion of the heater, temperature of a damaged site, a resistance value of the resistor, a current flowing to the resistor, and ON/OFF state of the heater.

When the temperature of a portion of the heater locally increases due to a damage of the portion as illustrated in (a) of FIG. 14, the resistance value of the resistor 31 in the contact detection layer 30 becomes large as illustrated in (b) of FIG. 14, and a current flowing to the resistor 31 on the contact detection layer 30 decreases as illustrated in (c) of FIG. 14.

When a voltage outputted from the detection circuit 40*a* is less than the second threshold, YES is selected in S300, and then, as illustrated in (d) of FIG. 14, the heater is deactivated (turned off) (S302). Specifically, energization of the heat generation portions 24 is suspended in preference to the processing illustrated in FIG. 10, to finish the present processing. In the present embodiment, configuration (software, hardware, or the like) for performing S302 in the control unit 40 constitute an energization suspension unit.

As described above, the resistor 31 is provided on the contact detection layer 30 disposed so as to cover the predetermined area of the planar heat generation layer 20, and detects local abnormal heat generation in the area. When the resistor 31 detects the local abnormal heat generation in the area, energization of the heat generation portions 24 can be suspended, preventing abnormal heat generation of the heater device 10.

Heater devices using Joule heat including the above-mentioned planar heater device generate heat by energizing a heat generation member including a resistor. When a portion of the heat generation member is damaged, a resistance value locally increases. The temperature of the damaged portion may be higher than the temperature of the undamaged portion. Such local heat generation cannot be measured using a temperature sensor such as the heat control temperature sensor 25. With the heater device 10, the resistance value of the resistor 31 on the contact detection layer 30 disposed so as to cover the predetermined area of the planar heat generation layer 20 can be collected as a temperature change of the entire heat generation layer 20, detecting the above-mentioned local heat generation. Specifically, the above-mentioned local heat generation can be detected based on an increase in the resistance value of the resistor 31, as opposed to contact with an object.

Fourth Embodiment

Figure 15:
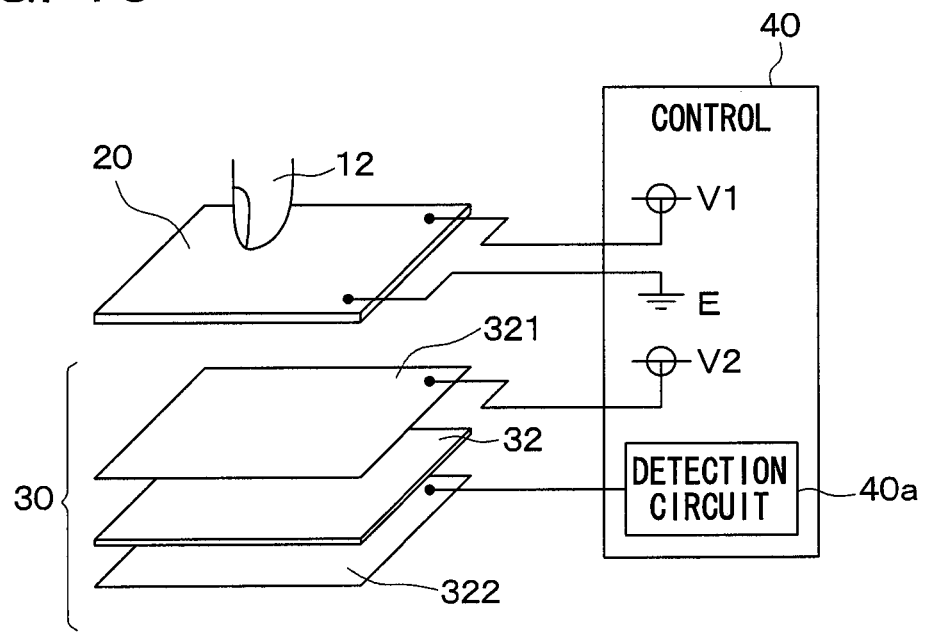
FIG. 15 is a view illustrating a heater device in accordance with a fourth embodiment.

FIG. 15 illustrates a configuration of a heater device 10 in accordance with the fourth embodiment. The heater device 10 in the present embodiment is different from the heater device 10 in the first embodiment in configuration of the contact detection layer 30 and processing of the control unit 40.

The contact detection layer 30 of the heater device 10 in the present embodiment includes a PTC layer 32, an electrode plate 321 and an electrode plate 322.

In FIG. 15, space is formed between the heat generation layer 20 and the electrode plate 321, between the electrode plate 321 and the PTC layer 32, and between the PTC layer 32 and the electrode plate 322. However, in fact, the heat generation layer 20, the electrode plate 321, the PTC layer 32, and the electrode plate 322 are stacked with each other.

Figure 16:
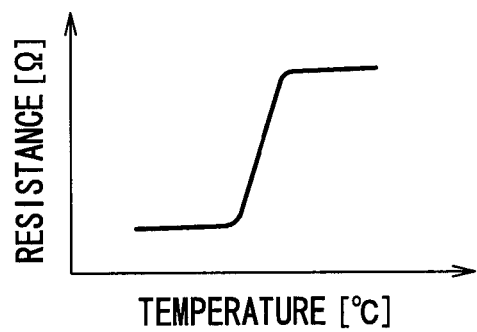
FIG. 16 is a view illustrating a PTC characteristic.

The PTC layer 32 is formed of a positive temperature characteristic member having a PTC (Positive Temperature Coefficient) characteristic, of a thin-plate shape. As illustrated in FIG. 16, the PTC layer 32 has the PTC characteristic that as the temperature decreases, the resistance value becomes smaller, and when the temperature rises to a predetermined temperature (Curie point), the resistance value rapidly becomes large. The PTC layer 32 corresponds to a temperature detection unit.

The electrode plate 321 and the electrode plate 322 each are formed of a thin plate-like conductive member. The electrode plate 321 and the electrode plate 322 are disposed so as to sandwich the PTC layer 32 from both sides.

The electrode plate 321 and the electrode plate 322 are connected to the detection circuit 40a of the control unit 40 via respective connection lines. A certain voltage (for example, 5V) is applied between the electrode plate 321 and the electrode plate 322. A detection circuit 40b in the present embodiment outputs a voltage responsive to a current passing between the electrode plate 321 and the electrode plate 322. The control unit 40 determines contact of an object with the heat generation layer 20 based on the voltage outputted from the detection circuit 40a.

The heat generation layer 20 of the heater device 10 in the present embodiment has the same configuration as the heat generation layer 20 of the heater device 10 in the first embodiment. That is, when the passenger's finger contacts the surface of the heat generation layer 20, as illustrated in FIG. 6, heat of the heat radiation portions 23 of the heat generation layer 20 is rapidly transferred to the contacting finger, and is radiated through the finger. Since the periphery of the heat radiation portions 23 is enclosed with the low heat conduction portion 26 made of a material having a lower heat conductivity than the heat radiation portions 23, heat transfer from the surroundings of the contact site of the surface of the heat generation layer 20 to the contact site is suppressed, rapidly decreasing the temperature of the contact site of the surface of the heat generation layer 20.

The heater device 10 in the present embodiment includes the heat generation layer 20 having the same configuration as that of the heat generation layer 20 of the heater device 10 in the first embodiment. With the heater device 10, even if the heat generating temperature is set to 100° C. or higher, when the passenger's finger contacts the surface of the heat generation layer 20, the temperature of the site decreases to, for example, about 40° C.

The heater device 10 includes the contact detection layer 30 having the PTC layer 32. When the temperature in the PTC layer 32 is higher than the predetermined temperature (Curie temperature), the resistance value also becomes larger, preventing a current from passing between the electrode plate 321 and the electrode plate 322.

However, when an object contacts the heat generation layer 20, and the temperature of the contact site lowers, the temperature of the contact detection layer 30 close to the contact site of also lowers. When the temperature of the PTC layer 32 of the contact detection layer 30 close to the contact site becomes lower than the predetermined temperature (Curie temperature), a current passes between the electrode plate 321 and the electrode plate 322 via a portion of the PTC layer 32.

With the heater device 10, the temperature change of the contact detection layer 30 is regarded as a change of the current passing between the electrode plate 321 and the electrode plate 322, and the detection circuit 40a detects the current change. When a current that is a reference value or more passes between the electrode plate 321 and the electrode plate 322, the energization amount of the heat generation portions 24 is decreased. By executing the processing, even when a human body contacts the heat radiation portion for a long time, thermal discomfort of the user can be prevented.

The control unit 40 of the heater device 10 in the first embodiment executes processing according to a flowchart illustrated in FIG. 10. However, with the configuration of the heater device 10, when, after start of energization of the heat generation portions 24, the temperature of the PTC layer 32 of the contact detection layer 30 is still lower than the predetermined temperature (Curie temperature), the resistance value of the PTC layer 32 is small, and a current passes between the electrode plate 321 and the electrode plate 322, leading to wrong determination that an object contacts the contact detection layer 30 even when no object contacts the contact detection layer 30.

Figure 17:
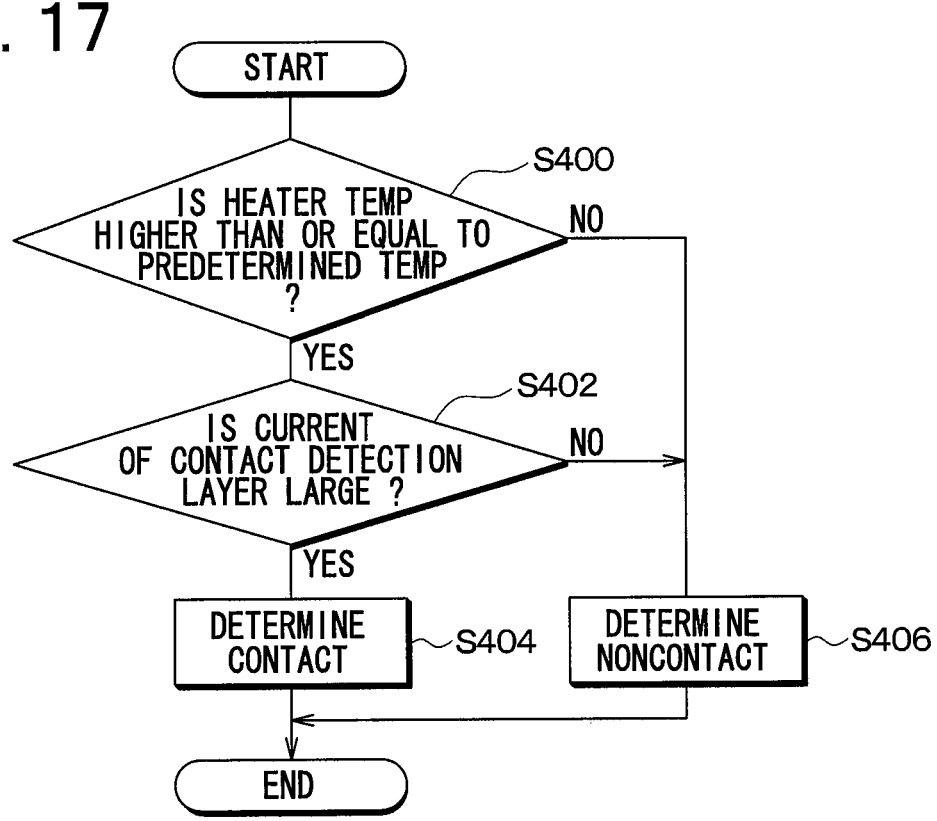
FIG. 17 is a flowchart of the control unit of the heater device in accordance with the fourth embodiment.

In order to prevent such wrong determination, in making determination in S100 and S104 in the flowchart illustrated in FIG. 10, the control unit 40 of the heater device 10 in the present embodiment executes processing illustrated in FIG. 17.

First, after start of energization of the heater device 10, it is determined whether or not the heater temperature becomes the predetermined temperature or more (S400). The temperature detected by the heat control temperature sensor 25 may be used as the heater temperature. The predetermined temperature is set to a temperature that is higher than Curie point of the PTC layer 32.

Here, when the heater temperature is less than the predetermined temperature immediately after start of energization of the heater device 10, NO is selected in S400, and it is determined that no object contacts the heat generation layer 20 (S406). As described above, it is determined that no object contacts the heat generation layer 20 to finish the processing.

When the heater temperature rises to the predetermined temperature or more after start of energization of the heater device 10, YES is selected in S400 and then, it is determined whether or not a current passing between the electrode plate 321 and the electrode plate 322 of the contact detection layer 30 is a predetermined reference value or more (S402). Here, when no object contacts the contact detection layer 30, and the current passing between the electrode plate 321 and the electrode plate 322 of the contact detection layer 30 is smaller than the reference value, it is determined that no object contacts the contact detection layer 30 (S406), to finish the processing.

When after start of energization of the heater device 10, the heater temperature rises to the predetermined temperature or more, and then, an object contacts the contact detection layer 30, causing the current passing between the electrode plate 321 and the electrode plate 322 of the contact detection layer 30 to become larger than the reference value, it is determined that the object contacts the contact detection layer 30 (S404), to finish the processing.

As described above, when the heater temperature is less than the predetermined temperature after start of energization of the heater device 10, it is determined that no object contacts the heat generation layer 20, preventing wrong determination.

Like the heater device 10 in the present embodiment, the heater device 10 in the first and second embodiments can execute the processing illustrated in FIG. 17.

Fifth Embodiment

Figure 18:
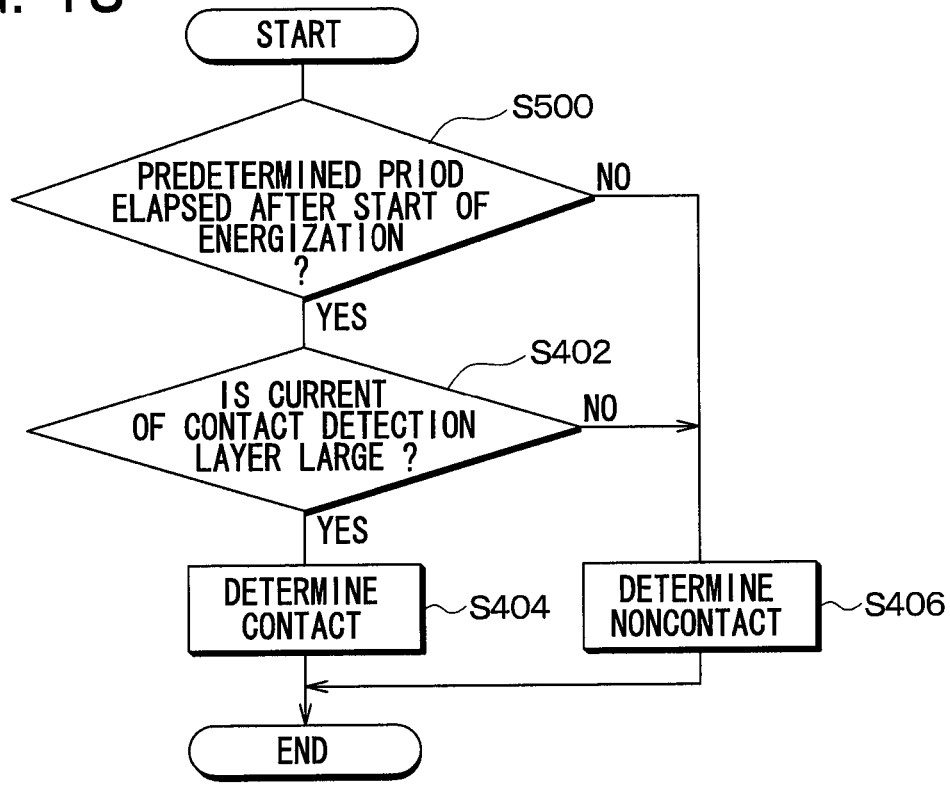
FIG. 18 is a flowchart of a control unit of a heater device in accordance with a fifth embodiment.

The heater device 10 in the present embodiment has the same configuration as the heater device 10 in the fourth embodiment. The heater device 10 in the present embodiment is different from the heater device 10 in the fourth embodiment in processing of the control unit 40. FIG. 18 is a flowchart of the control unit 40 of the heater device 10 in accordance with the present embodiment.

In the fourth embodiment, in S400, the control unit 40 determines whether or not the heater temperature becomes the predetermined temperature or more after start of energization of the heater device 10. The control unit 40 in the present embodiment determines whether or not a certain period elapses after energization of the heater device 10 in S500.

Specifically, in S500, it is determined whether or not a certain period elapses from start of energization of the heater device 10. The certain period is set to a period that is longer than a period in which the heater temperature rises to Curie point of the PTC layer 32.

Here, when the certain period does not elapse after start of energization of the heater device 10, NO is selected in S500, and it is determined that no object contacts the heat generation layer 20 (S406). As described above, it is determined that no object contacts the heat generation layer 20 to finish the processing. When the certain period elapses after start of energization of the heater device 10, YES is selected in S500 to proceed to S402.

As described above, when the predetermined period does not elapse after start of energization of the heater device 10, it is determined that no object contacts the heat generation layer 20, preventing wrong determination.

Like the heater device 10 in the present embodiment, the heater device 10 in the first and second embodiments can execute the processing illustrated in FIG. 18.

Sixth Embodiment

Figure 19:
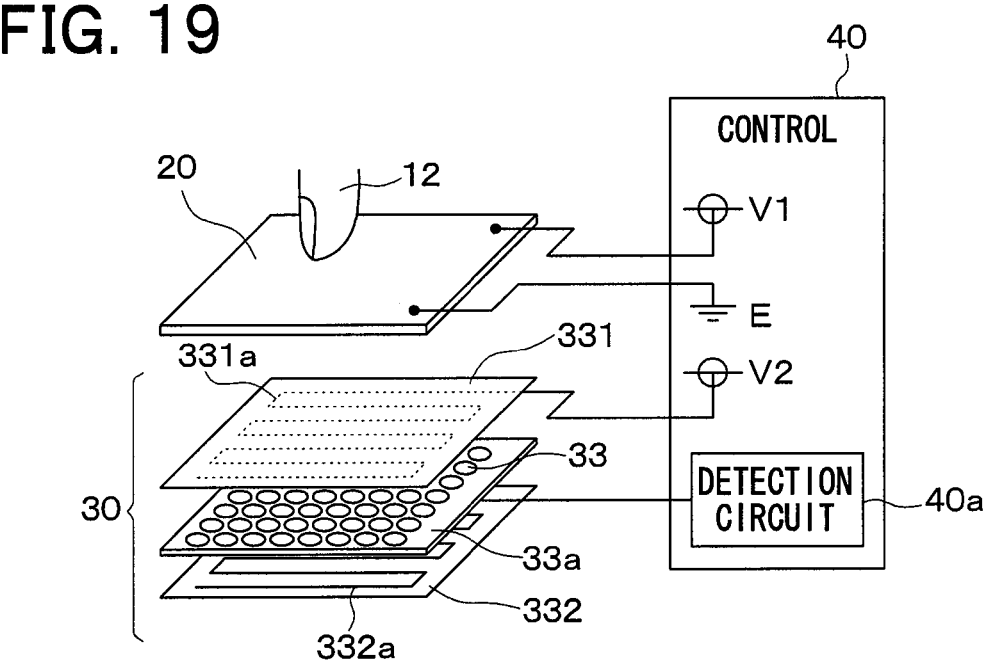
FIG. 19 is a view of a configuration of a heater device in accordance with a sixth embodiment.
Figure 20:
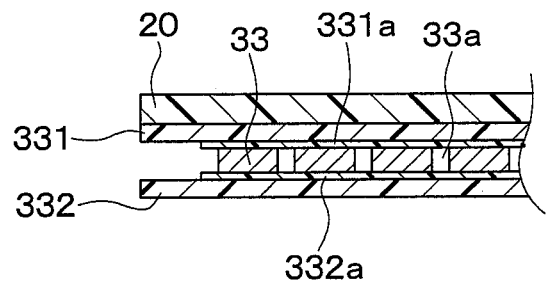
FIG. 20 is a schematic sectional view of the heater device in accordance with the sixth embodiment.

FIG. 19 illustrates a configuration of a heater device 10 in accordance with the sixth embodiment. FIG. 20 is a schematic sectional view of the heater device 10. The heater device 10 in the present embodiment is different from the heater device 10 in each of the fourth embodiment in configuration of the contact detection layer 30.

The contact detection layer 30 of the heater device 10 in the present embodiment includes an insulating layer 33a in which a lot of PTC characteristic members 33 each having a PTC characteristic are embedded, and the first electrode plate 321 and the second electrode plate 322 that sandwich the insulating layer 33a therebetween from both sides of the insulating layer 33a.

The PTC characteristic members 33 pass through the insulating layer 33a, and are spot-shaped (dot-shaped) in a plan view of the insulating layer. The PTC characteristic members 33 correspond to a temperature detection unit. The insulating layer 33a is made of insulating resin.

A first electrode layer 331 is disposed on one face side of the insulating layer 33a, and a second electrode layer 332 is disposed on the other face side of the insulating layer 33a. The first electrode layer 331 has a linear electrode 331a that is in contact with the PTC characteristic members 33 on one face side of the insulating layer 33a. The second electrode layer 332 has a linear electrode 332a that is in contact with the PTC characteristic members 33 on the other face side of the insulating layer 33a. The electrode 331a and the electrode 332a each meander. A distance between the meandering patterns of the electrode 331a and the electrode 332a in the widthwise direction is about 5 mm.

A certain voltage (for example, 5V) is applied to the electrode 331a of the first electrode layer 331 and the electrode 332a of the second electrode layer 332. The detection circuit 40b in the present embodiment outputs a voltage responsive to a current passing between the electrode 331a and the electrode 332a.

The heater device 10 includes the contact detection layer 30 having the insulating layer 33a in which a lot of PTC characteristic members 33 are embedded. When the temperature of the heat generation layer 20 is high, and the temperature of the PTC characteristic members 33 is higher than the predetermined temperature (Curie temperature), the resistance value of the PTC characteristic members 33 is large, and no current flows between the electrode 331a and the electrode 332a.

However, when an object contacts the heat generation layer 20, and the temperature of the contact site lowers, the temperature of the contact detection layer 30 close to the contact site of also lowers. When the temperature of the PTC characteristic member 33 of the contact detection layer 30 close to the contact site is lower than the predetermined temperature (Curie temperature), a current flows between the electrode 331a and the electrode 332a via some PTC characteristic members 33.

With the heater device 10, when the detection circuit 40a detects the temperature change of the contact detection layer 30 as a change of the current passing between the electrode 331a and the electrode 332a, and a current that is a reference value or more passes between the electrode 331a and the electrode 332a, processing of decreasing the energization amount of the heat generation portions 24 is executed.

As in the fourth embodiment, the PTC layer 32, the electrode plate 321, and the electrode plate 322 are layered structure and thus, heat is easily trapped in the contact detection layer 30. On the contrary, with the configuration in the present embodiment, the first electrode layer 331 is disposed on one face side of the insulating layer 33a, and has the linear electrode 331a that is in contact with the PTC characteristic members 33 on one face side of the insulating layer 33a, and the second electrode layer 332 is disposed on the other face side of the insulating layer 33a, and has the linear electrode 332a that is in contact with the PTC characteristic members 33 on the other face side of the insulating layer 33a. Accordingly, heat is hardly trapped in the contact detection layer 30. With the configuration including the PTC layer 32 as in the fourth embodiment, a lot of positive temperature characteristic members constituting the PTC layer are required. On the contrary, with the configuration in the present embodiment, since the PTC characteristic members 33, which pass through the insulating layer 33a and are divided into a plurality of areas, detect the temperature change of the heat generation layer 20, a small number of positive temperature characteristic members can constitute the contact detection layer 30, reducing costs.

Seventh Embodiment

Figure 21:
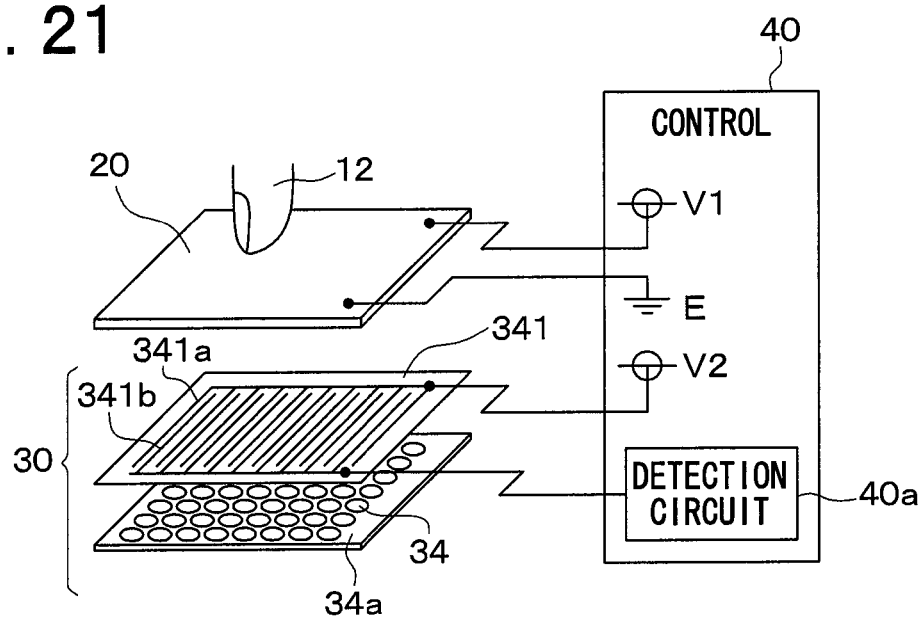
FIG. 21 is a view of a configuration of a heater device in accordance with a seventh embodiment.
Figure 22:
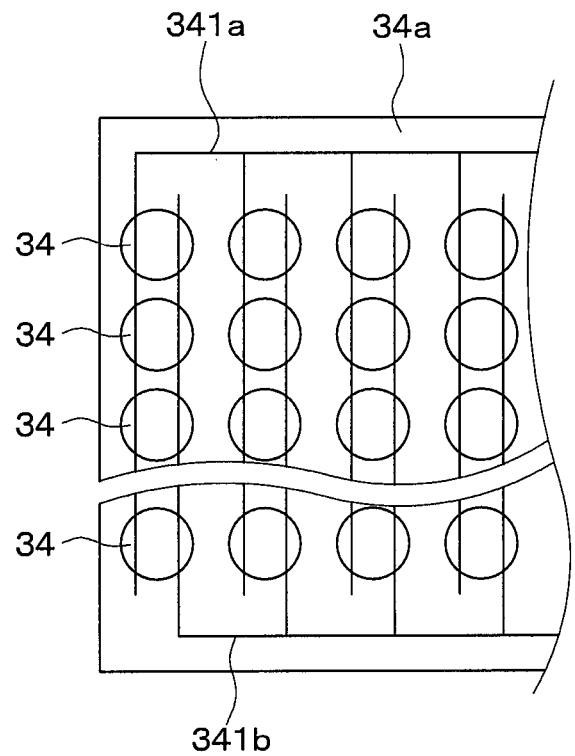
FIG. 22 is an overlap view illustrating first and second electrode plates and a PTC characteristic member in the contact detection layer of the heater device in the seventh embodiment.

FIG. 21 illustrates a configuration of a heater device 10 in accordance with the seventh embodiment. FIG. 22 illustrates the state where the first electrode plate 321, the second electrode plate 322, and PTC characteristic members 34 in the contact detection layer 30 of the heater device 10 in the present embodiment overlap one another. The heater device 10 in the present embodiment is different from the heater device 10 in the sixth embodiment in configuration of the contact detection layer 30.

The heater device 10 in the sixth embodiment is configured such that the first electrode plate 321 and the second electrode plate 322 sandwich the insulating layer 33a, in which the PTC characteristic members 33 are embedded, from both sides of the insulating layer 33a. On the contrary, the heater device 10 in the present embodiment includes an electrode layer 341 having two comb-like electrodes 341a, 341b on one face side of an insulating layer 34a in which the PTC characteristic members 34 are formed.

The PTC characteristic members 34 each are spot-shaped (dot-shaped) on one face side of the insulating layer 34a in a plan view of the insulating layer 34a. That is, the PTC characteristic members 34 are formed on one face side of the insulating layer 34a to be divided into a plurality of areas. The PTC characteristic members 34 correspond to a temperature detection unit.

The electrode layer 341 is stacked on the insulating layer 34a. The two electrodes 341a, 341b, which are connected to each other via the PTC characteristic members 34 in the insulating layer 34a, are formed on the electrode layer 341. The insulating layer 34a is made of an insulating resin.

The electrode 341a and the electrode 341b each are comb-like. The electrode 341a and the electrode 341b are formed such that their teeth of the combs are opposed to each other. A widthwise distance between the tooth of the electrode 341a and the corresponding tooth of the electrode 341b is about 2 mm. As illustrated in FIG. 22, the electrode 341a and the electrode 341b are connected to each other via the PTC characteristic members 34.

When the temperature of the heat generation layer 20 is high, and the temperature of the PTC characteristic members 34 is higher than the predetermined temperature (Curie temperature), the resistance value of the PTC characteristic members 34 is large, and no current flows between the electrode 341a and the electrode 341b.

However, when an object contacts the heat generation layer 20, and the temperature of the contact site lowers, the temperature of the contact detection layer 30 located close to the contact site also lowers. When the temperature of the PTC characteristic member 34 of the contact detection layer 30 located close to the contact site is lower than the predetermined temperature (Curie temperature), a current flows between the electrode 341a and the electrode 341b via some PTC characteristic members 34.

With the heater device 10, when the detection circuit 40a detects the temperature change of the contact detection layer 30 as a change of the current passing between the electrode 341a and the electrode 341b, and a current that is a reference value or more passes between the electrode 341a and the electrode 341b, processing of decreasing the energization amount of the heat generation portions 24 is executed.

With the configuration as in the sixth embodiment, in which the PTC layer 32 is sandwiched between the electrode plate 321 and the electrode plate 322, two electrode plates are required. On the contrary, with the heater device 10 in the present embodiment, one electrode plate can constitute the contact detection layer 30.

Eighth Embodiment

Figure 23:
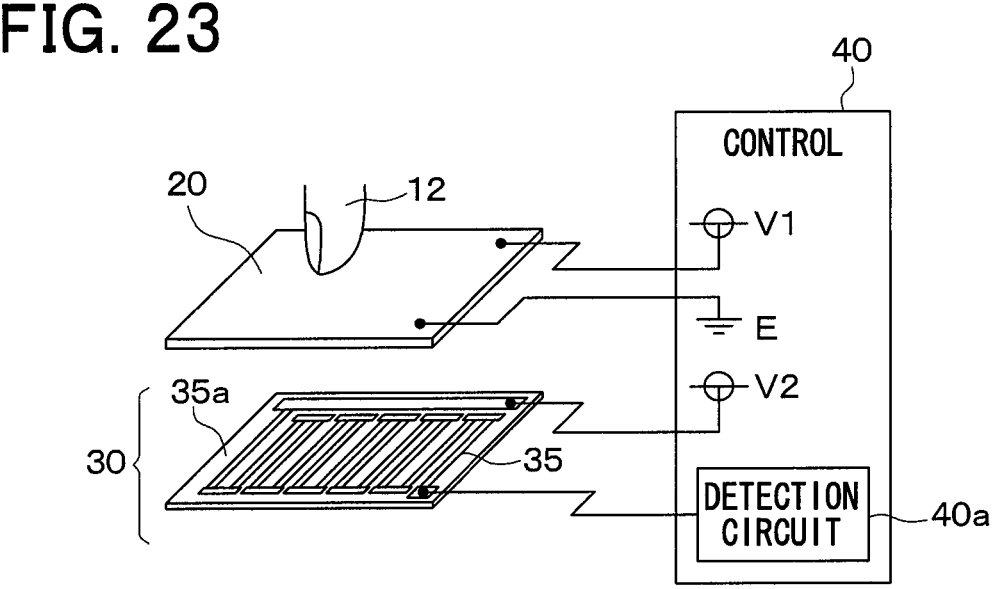
FIG. 23 is a view illustrating a configuration of a heater device in accordance with an eighth embodiment.

FIG. 23 illustrates a configuration of a heater device 10 in accordance with the eighth embodiment. The heater device 10 in the present embodiment is different from the heater device 10 in the seventh embodiment in configuration of the contact detection layer 30.

The heater device 10 in the above-mentioned embodiments includes the PTC characteristic member having the PTC characteristic, while the heater device 10 in the present embodiment includes an insulating layer 35a in which a linear NTC (Negative Temperature Coefficient) characteristic member 35 having an NTC characteristic. The NTC characteristic member 35 meanders on one face of the insulating layer 35a. The insulating layer 35a is made of an insulating resin.

Figure 24:
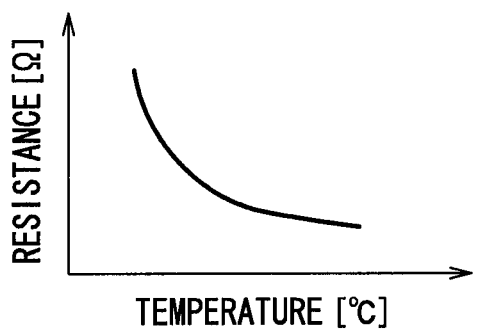
FIG. 24 is a view illustrating an NTC characteristic.

As illustrated in FIG. 24, the NTC characteristic member 35 has an NTC characteristic that the resistance value is large when the temperature is low, and the resistance value becomes smaller as the temperature rises. The NTC characteristic member 35 corresponds to a temperature detection unit.

When the temperature of the heat generation layer 20 is high, and the temperature of the NTC characteristic member 35 is low, the resistance value of the NTC characteristic member 35 is small, allowing a current to pass to the NTC characteristic member 35.

However, when an object contacts the heat generation layer 20, and the temperature of the contact site lowers, the temperature of the contact detection layer 30 located close to the contact site also lowers. When the temperature of the NTC characteristic member 35 of the contact detection layer 30 located close to the contact site becomes low, a current does not flow to a portion of the NTC characteristic member 35.

With the heater device 10, when the detection circuit 40a detects the temperature change of the contact detection layer 30 as a change of the current passing to the NTC characteristic member 35, and a current that is a reference value or more passes to the NTC characteristic member 35, processing of decreasing the energization amount of the heat generation portions 24 is executed.

Ninth Embodiment

The heater device 10 in the eighth embodiment includes the insulating layer 35a in which the NTC characteristic member 35 having the NTC characteristic is formed. On the contrary, the heater device 10 in the present embodiment includes an insulating layer in which a CTR (Critical Temperature Resistor) characteristic member having a CTR characteristic is formed. The CTR characteristic member may be made of a transition metal oxide (for example, vanadium oxide).

Figure 25:
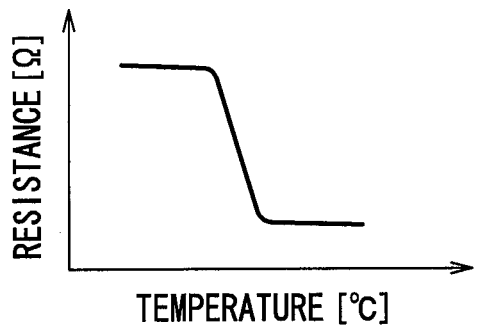
FIG. 25 is a view illustrating a CTR characteristic.

As illustrated in FIG. 24, the NTC characteristic is the characteristic that the resistance value is large when the temperature is low, and the resistance value becomes smaller as the temperature rises. As illustrated in FIG. 25, in the CTR characteristic, the resistance value is large when the temperature is low, and the resistance value becomes rapidly small when the temperature rises to a predetermined temperature (Curie point).

By using the CTR characteristic member as the negative temperature characteristic member as described above, contact of an object with the heat generation layer 20 can be detected with high sensitivity.

Tenth Embodiment

The heater device 10 in the first embodiment includes the resistor (detection resistor) 31 having the positive temperature characteristic, while a heater device 10 in the present embodiment includes a detection resistor 31 having a PTC characteristic. The heater device 10 in the present embodiment is different from the heater device 10 in the first embodiment in processing of the control unit 40.

Figure 26:
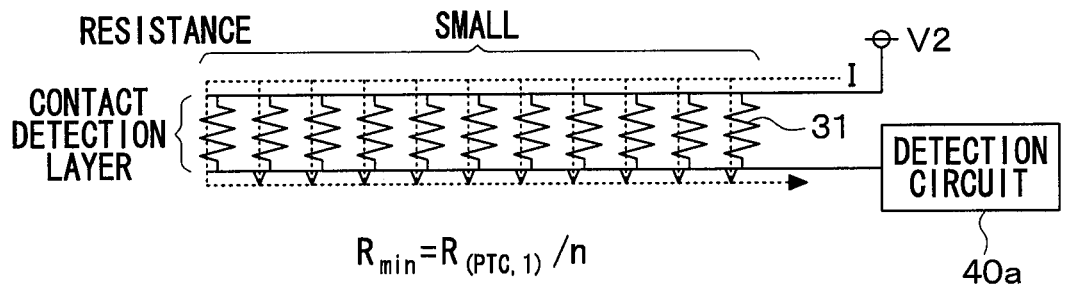
FIG. 26 is a view for describing a change of a resistance value of a combined resistance of detection resistors in the contact detection layer.
Figure 27:
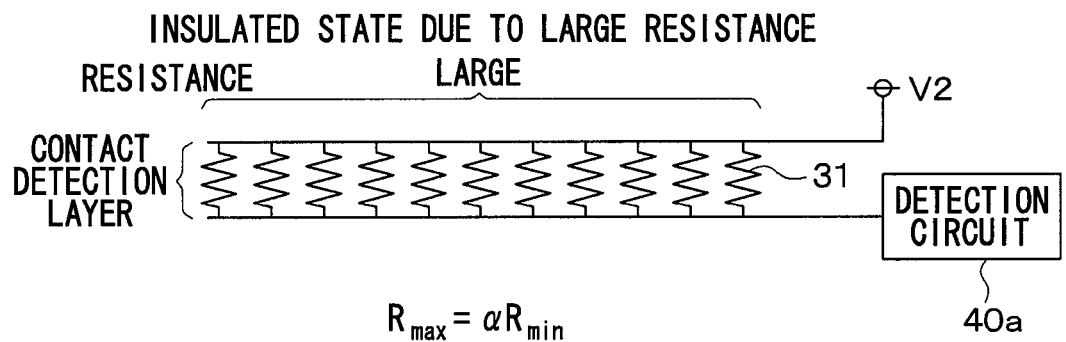
FIG. 27 is a view for describing a change of the resistance value of the combined resistance of the detection resistors in the contact detection layer.
Figure 28:
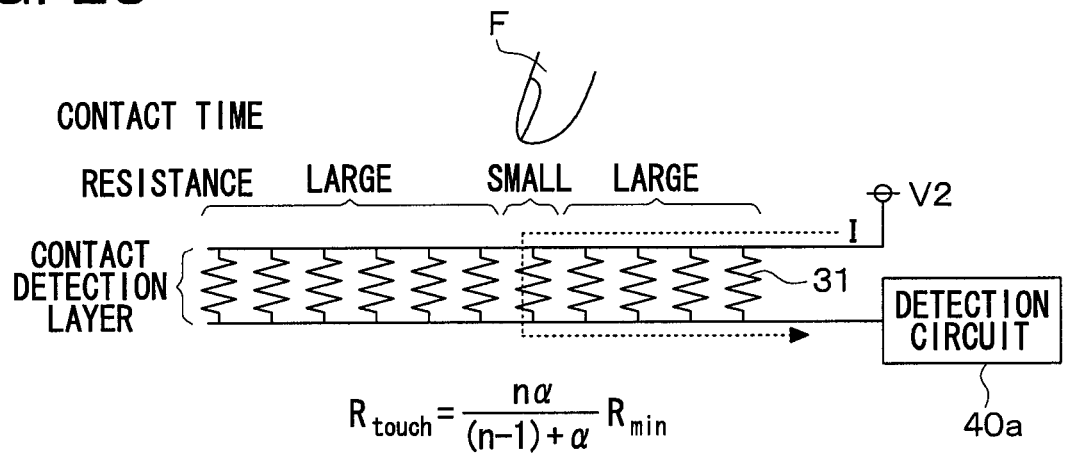
FIG. 28 is a view for describing a change of the resistance value of the combined resistance of the detection resistors in the contact detection layer.

First, with reference to FIG. 26 to FIG. 29, a change of a resistance value of a combined resistance of the detection resistors 31 on the contact detection layer 30 will be described. FIG. 26 to FIG. 28 each illustrate an equivalent circuit of the contact detection layer 30. In FIG. 26 to FIG. 28, a predetermined voltage V2 is applied from a power terminal to the detection resistors 31 in the contact detection layer 30.

As illustrated in FIG. 26, at low temperatures, when the temperature of the detection resistor 31 in the contact detection layer 30 is lower than a predetermined temperature (Curie temperature), a combined resistance of the detection resistors 31 is small, allowing a current I to pass through each of the detection resistors 31. It is assumed that the resistance values of the detection resistors 31 are equal. It is assumed that the detection resistor 31 is formed by connecting n resistors to each other in parallel. In this case, given that the resistance value of the detection resistor 31 is R (PTC, 1), a combined resistance Rmin at this time can be expressed as R (PTC, 1)/n.

As illustrated in FIG. 27, when the temperature of the detection resistors 31 in the contact detection layer 30 becomes higher than the predetermined temperature (Curie temperature) due to heat generated by the heat generation layer 20, the combined resistance of the detection resistors 31 becomes large, inhibiting a current to pass to the detection resistors 31. Given that a temperature coefficient of the detection resistors 31 is α, a combined resistance Rmax at this time can be expressed as αRmin.

As illustrated in FIG. 28, at such high temperatures, when the temperature of a contact site of the heat generation layer 20 with an object F (for example, the user's finger) lowers, and the temperature of the detection resistors 31 in the contact detection layer 30 becomes lower than the predetermined temperature (Curie temperature), the resistance value of the detection resistor 31 at the site where the temperature lowers rapidly decreases, thereby rapidly decreasing the value of the combined resistance of the detection resistors 31. Then, the current I is passed from a power source to the detection circuit 40a through the detection resistors 31. Here, a combined resistance Rtouch acquired when the temperature of one detection resistor 31 is lower than the predetermined temperature (Curie temperature) can be represented as $(n\alpha/(n-1)+\alpha)$ Rmin.

Figure 29:
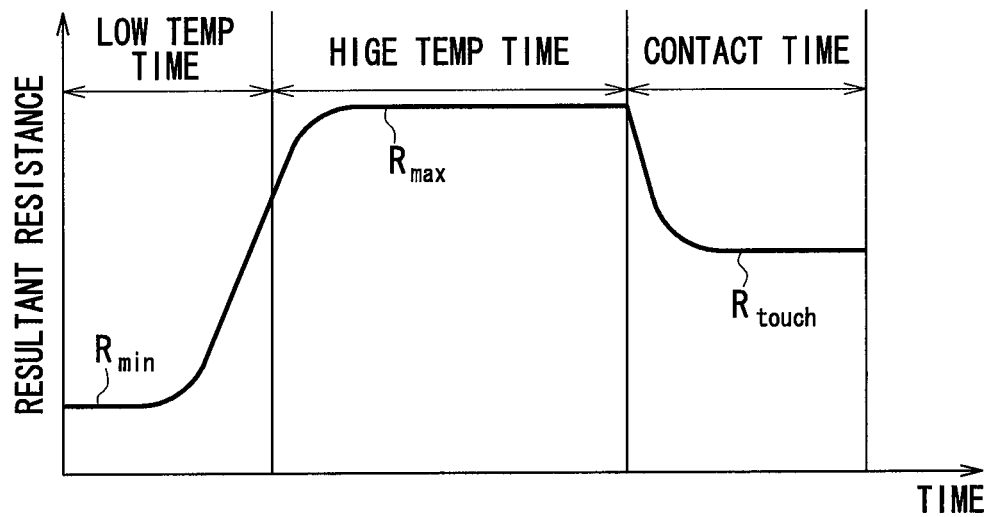
FIG. 29 is a view for describing a change of the resistance value of the combined resistance of the detection resistors in the contact detection layer.

As illustrated in FIG. 29, immediately after start of activation of the heater device 10, when the temperature of the detection resistors 31 in the contact detection layer 30 is lower than the predetermined temperature (Curie temperature), the combined resistance of the detection resistors 31 is a relatively small Rmin. When the temperature of the detection resistors 31 in the contact detection layer 30 becomes higher than the predetermined temperature (Curie temperature) due to heat generated by the heat generation layer 20, the combined resistance of the detection resistors 31 is a relatively large Rmax. At high temperatures, when the object F (for example, the user's finger) contacts the heat generation layer 20, the combined resistance of the detection resistors 31 rapidly decreases. The combined resistance Rtouch at contact is an intermediate value between the combined resistance Rmin at low temperatures and the combined resistance Rmax at high temperatures.

The control unit 40 of the heater device 10 in the present embodiment detects contact of an object with the heat generation layer 20 based on a change of the combined resistance of the detection resistors 31, and determines that the object contacts the heat generation layer 20, the heater control temperature is lowered. Specifically, the control unit 40 lowers the heater control temperature to about the temperature of human skin (for example, 37° C.).

However, when the heater control temperature is lowered to about the human skin temperature (for example, 37° C.) in this manner, the temperature of the detection resistors 31 becomes lower than Curie temperature, and the combined resistance of the detection resistors 31 becomes smaller than the combined resistance Rtouch at contact. When the combined resistance of the detection resistors 31 becomes smaller than the combined resistance Rtouch at contact, even if the object is away from the heat generation layer 20, it cannot be detected that the object is separated from the heat generation layer 20.

For this reason, when determining that the object contacts the heat generation layer 20, the control unit 40 in the present embodiment lowers the heater control temperature to the human skin temperature (for example, 37° C.) for a certain time and then, increases the combined resistance of the detection resistors 31 to be sufficiently larger than the combined resistance Rtouch at contact. When an increase in the combined resistance of the detection resistors 31 is less than a specified value, the control unit 40 determines that contact of the object with the heat generation layer 20 continues, and decreases the heater control temperature again. On the contrary, when an increase in the combined resistance of the detection resistors 31 is the specified value or more, the control unit 40 determines that the contact of the object with the heat generation layer 20 is absent, and executes processing of releasing the decrease in the heater control temperature.

Figure 30:
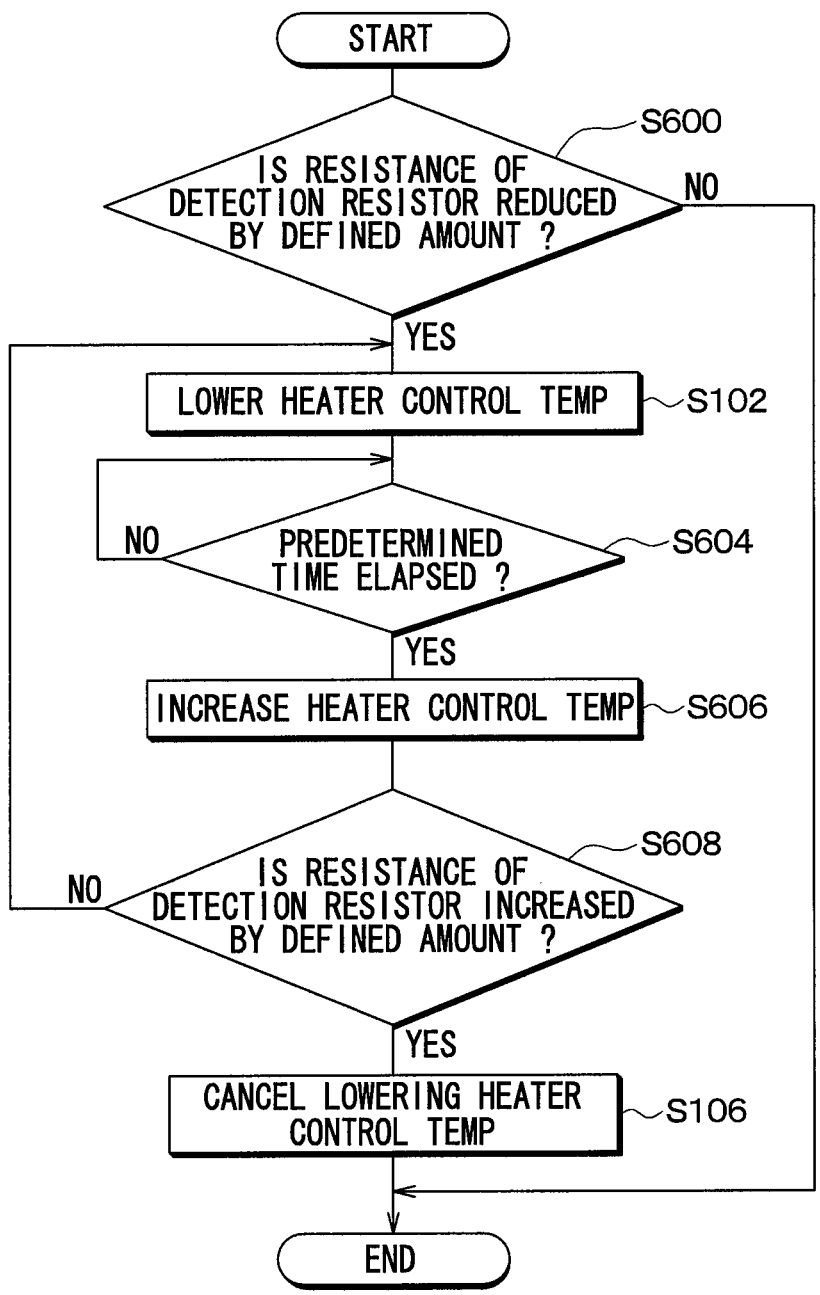
FIG. 30 is a flowchart of a control unit of a heater device in accordance with a tenth embodiment.
Figure 31:
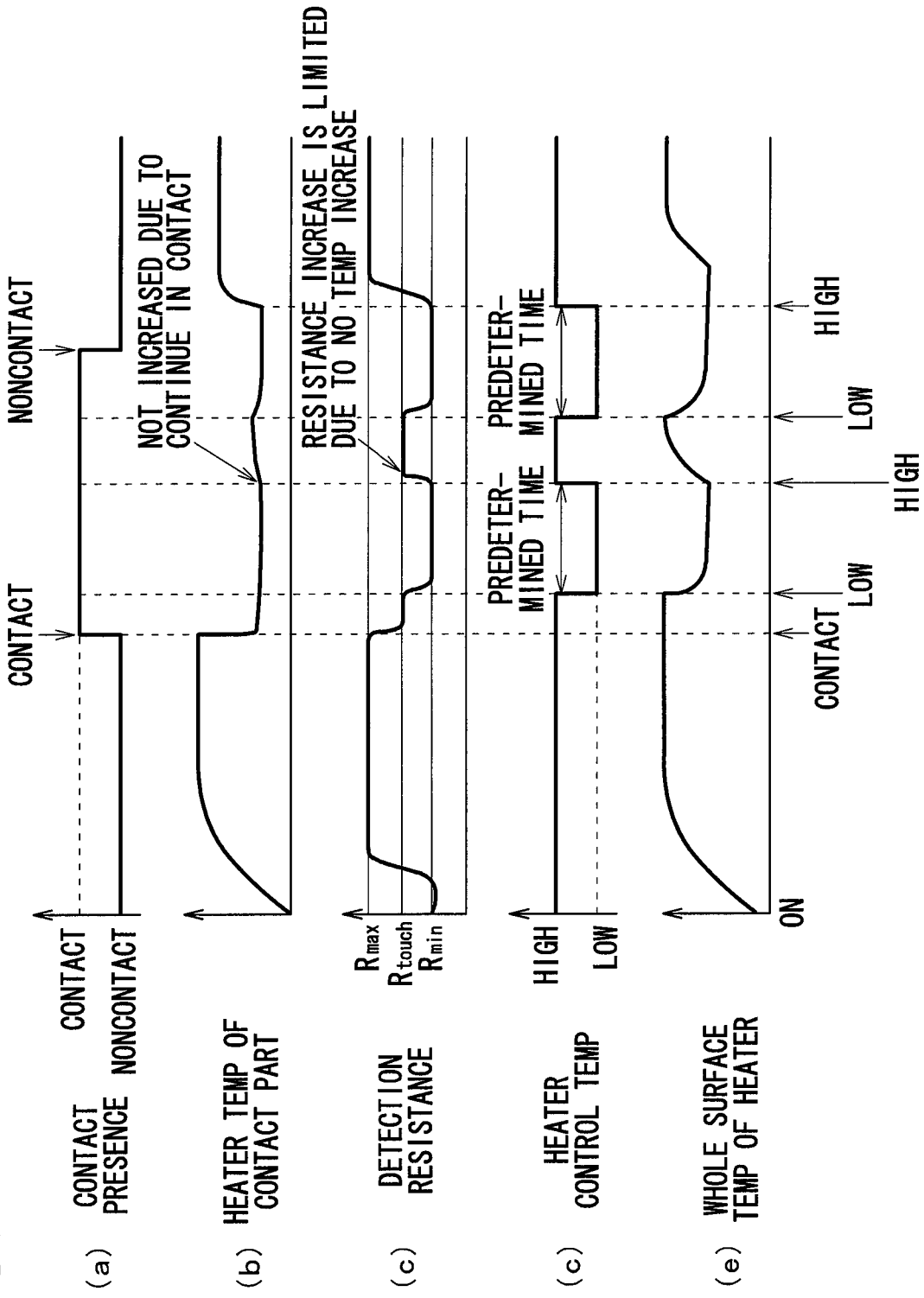
FIG. 31 is a time chart illustrating control of the control unit of the heater device.

FIG. 30 is a flowchart of the processing. FIG. 31 is a time chart for describing the processing. When the heater device 10 is activated in accordance with the user's operation of a switch of the operation unit 50, the control unit 40 sets the heater control temperature to a setting temperature (high level) set by the user's operation of the switch, energizes the heat generation portions 24 such that the temperature detected by the heat control temperature sensor 25 approaches the heater control temperature, and periodically executes processing illustrated in FIG. 30.

First, it is determined whether or not the contact of the object with the heat generation layer 20 is detected based on whether or not the resistance value of the detection resistor 31 lowers by a specified amount or more (S600). Specifically, it is determined whether or not the contact of the object with the heat generation layer 20 is detected based on whether or not an output voltage outputted from the detection circuit 40a increases by a specified amount or more.

Here, as illustrated in (a) to (c) of FIG. 31, when an object contacts the heat generation layer 20, the heater temperature of the contact site of the heat generation layer 20 lowers, and the resistance value of the detection resistor 31 decreases from about the combined resistance Rmax at high temperatures to about the combined resistance Rtouch at contact.

When the output voltage outputted from the detection circuit 40a increases by the specified amount, YES is selected in S600 and then, the heater control temperature is decreased from the setting temperature (high level) set in accordance with the user's operation to the low level (S102). Here, the low level is a temperature at which the heater temperature is about the human skin temperature. Specifically, the energization amount of the heat generation portions 24 is reduced.

When the temperature of the heat generation layer 20 lowers, and the temperature of the detection resistor 31 becomes lower than a predetermined temperature (Curie point), as illustrated in (c) of FIG. 31, the combined resistance of the detection resistors 31 becomes smaller than the combined resistance Rtouch at contact, resulting in that contact of the object with the heat generation layer 20 cannot be detected.

Next, it is determined whether or not a predetermined time elapses after the energization amount of the heat generation portions 24 is decreased (S604). The predetermined time is set to be longer than time required to lower the temperature of the heat generation portions 24 to temperature that gives no thermal discomfort to the user.

Here, when the predetermined time does not elapse after the energization amount of the heat generation portions 24 is decreased, NO is selected in S604, and determination in S604 is repeated. When the predetermined time elapses, YES is selected in S604 and then, the heater control temperature is increased such that the contact of the object with the heat generation layer 20 can be detected (S606). Specifically, the heater control temperature is changed from the low level to the high level, and the energization amount of the heat generation portions 24 is increased. S606 corresponds to an energization amount increase unit that increases the energization amount of the heat generation layer 20. Here, thermal discomfort to the user is reduced by making the temperature-rising speed of the heat generation layer 20 more gentle than usual.

Next, it is determined whether or not the object contacts the heat generation layer 20 based on whether or not the resistance value of the detection resistor 31 increases by a specified amount or more (S608). Specifically, it is determined whether or not contact of the object with the heat generation layer 20 is detected based on whether or not a certain time elapses after the heater control temperature is changed from the low level to the high level and then, the output voltage outputted from the detection circuit 40a increases by a specified amount or more. In more detail, when the output voltage outputted from the detection circuit 40a increases by a specified amount or more, it is determined that no object contacts the heat generation layer 20, and when the output voltage outputted from the detection circuit 40a does not increase by the specified amount or more, it is determined that an object contacts the heat generation layer 20. S608 corresponds to a contact redetermination unit that re-determines contact of the object with the heat generation layer.

Here, when the contact of the object with the heat generation layer 20 continues, as illustrated in (b) of FIG. 31, the object remains to contact the heat generation layer 20 and thus, the temperature of the detection resistor 31 does not exceed Curie temperature. For this reason, as illustrated in (c) of FIG. 31, an increase in the resistance value of the detection resistor 31 is limited. The temperature of the contact site of the heat generation layer 20 with the object rises more gently than the temperature of the remaining site of the heat generation layer 20. For this reason, the resistance value of the detection resistor 31 only increases to about the combined resistance Rtouch at maximum. In this case, the output voltage outputted from the detection circuit 40a does not increase by the specified amount or more, NO is selected in S608, the heater control temperature is decreased again in S102. Specifically, the heater control temperature is changed from the high level to the low level. In this manner, the energization amount of the heat generation portions 24 is controlled to be decreased.

When a predetermined time elapses after the energization amount of the heat generation portions 24 is decreased, YES is selected in S604, and the heater control temperature is increased in S606.

At this time, when the contact of the object with the heat generation layer 20 is absent, the heat generation layer 20 starts to rise in temperature, and the temperature of the detection resistors 31 becomes higher than Curie temperature. Then, after the heat generation layer 20 starts to rise in temperature, the resistance value of the detection resistors 31 increases by a specified amount or more. When the output voltage outputted from the detection circuit 40a increases by the specified amount or more, YES is selected in S608, and the heater control temperature is returned (S106). Specifically, the heater control temperature is changed from the low level to the high level, and the energization amount of the heat generation portions 24 is returned to the original energization amount to finish the processing. S106 corresponds to an energization amount return unit that returns the energization amount of the heat generation portions to the original energization amount. Accordingly, radiant heat radiated from the heat generation portions 24 increases, and returns to the original heating value.

As described above, when the energization amount of the heat generation layer 20 is decreased in S102, the energization amount of the heat generation layer 20 is increased after an elapse of the predetermined time in S606 to increase the energization amount of the heat generation layer 20. Then, the contact of the object with the heat generation layer 20 is re-determined in S608, and when it is determined that the contact of the object with the heat generation layer 20 is present, the energization amount of the heat generation layer 20 is decreased in S102. Thus, when the contact of the object with the heat generation layer 20 continues, the energization amount of the heat generation layer 20 can be continuously decreased.

When the contact of the object with the heat generation layer 20 is re-determined in S608, and it is determined that the contact of the object with the heat generation layer 20 is absent, the energization amount of the heat generation portions is returned to the original energization amount in S106, maintaining comfortability.

Eleventh Embodiment

In the heater device 10 in the tenth embodiment, the heater control temperature is increased from the low level to the high level in S606. On the contrary, with the heater device 10 in the present embodiment, the heater control temperature is set to a lowest setting level at normal operation in S606.

Figure 32:
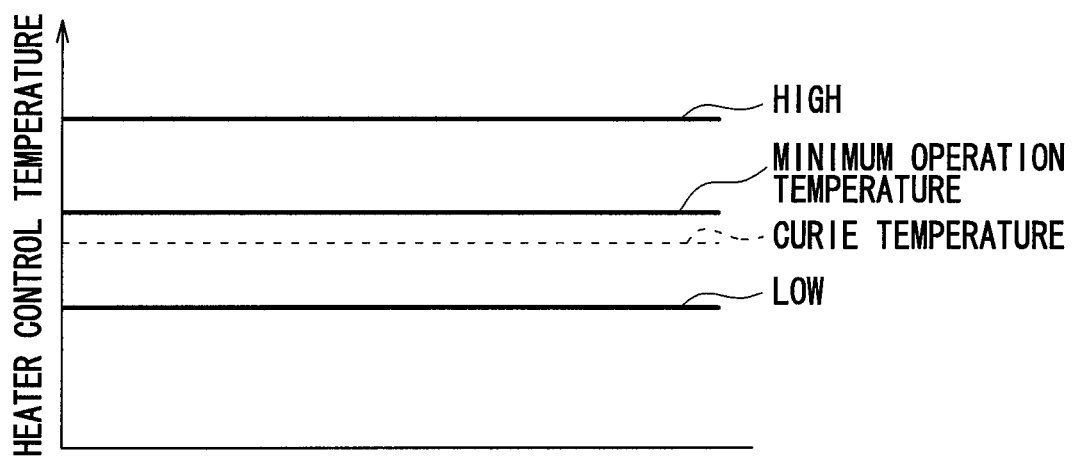
FIG. 32 is a view for describing a heater control temperature.

Next, the heater control temperature will be described with reference to FIG. 32. The high level is level set in accordance with the user's operation. The low level is level set when an object contacts the heat generation layer 20. When the heater control temperature is set to the low level, the heater temperature becomes the human skin temperature.

The minimum setting level is level set when the heater control temperature is set to the minimum setting temperature that can be set in accordance with the user's operation. The minimum setting temperature is higher than Curie temperature of the detection resistors 31.

When the heater temperature is decreased in S102 and then, it is determined that the predetermined time elapses in S606, the control unit 40 of the heater device 10 in the present embodiment sets the heater control temperature to the minimum setting level (S608). Specifically, the heater control temperature is set to the temperature that is higher than Curie temperature of the detection resistors 31, and the minimum setting temperature that can be set in accordance with the user's operation.

When it is determined that no object contacts the heat generation layer 20 in S608, the heater control temperature is changed to the high level in S106, and the energization amount of the heat generation portions 24 is returned to the original energization amount to finish the processing.

As described above, in the present embodiment, since the heater control temperature is set to the temperature that is higher than Curie temperature of the detection resistors 31, and the minimum setting temperature that can be set in accordance with the user's operation in S608, non-contact of the object with the heat generation layer 20 can be detected at lower temperatures than the heater device 10 in the tenth embodiment. That is, non-contact of the object with the heat generation layer 20 can be detected without increasing the temperature of the heat generation layer 20 than necessary.

In the present embodiment, the heater control temperature is set to the temperature that is higher than Curie temperature of the detection resistors 31, and the minimum setting temperature that can be set in accordance with the user's operation in S608. However, for example, the heater control temperature may be set to a predetermined temperature that is higher than Curie temperature of the detection resistors 31.

Other Embodiments

In the above embodiments, the heater device 10 is installed in the interior of the road travelling vehicle. The heater device 10 may be installed in the interior of a mobile body such as a ship, an airplane, or the like.

In the first and second embodiments, the heater control temperature is decreased. However, energization of the heat generation portions 24 may be suspended.

In the first to third embodiments, the heat generation layer 20 and the contact detection layer 30 are individual layers. However, the heat generation layer 20 and the contact detection layer 30 may be disposed on opposite respective faces of one layer, or a wire of the heat generation layer 20 and a resistor line of the contact detection layer 30 may be disposed in one layer in parallel.

In the first to seventh embodiments, the PTC characteristic member having the PTC characteristic detects the temperature of the heat generation layer. However, the NTC characteristic member having the NTC characteristic or the CTR characteristic member having the CTR characteristic may detect the temperature of the heat generation layer.

In the first to third embodiments, the detection circuit 40*a* that outputs a voltage responsive to a current passing to the resistor 31 detects the contact of the object with the heat generation layer 20. For example, the contact of the object with the heat generation layer 20 may be detected using a pressure-sensitive sensor that detects a pressure of the object onto the heat generation layer 20.

Although the heat generation portion 24 is arranged between adjacent heat radiation portions 23 in each of the embodiments, the present disclosure is not limited to the arrangement. For example, the heat generation portion 24 may be provided in an area constituting the heat radiation portions 23 in the heat generation layer 20.

It should be appreciated that the present disclosure is not limited to the embodiments described above and can be modified appropriately within the scope of the appended claims. The embodiments above are not irrelevant to one another and can be combined appropriately unless a combination is obviously impossible. Also, in a case where a reference is made to the components of the respective embodiments above as to materials, shapes and positional relations, the components are not limited to the materials, the shapes and the positional relations unless explicitly specified or limited to particular materials, shapes and positional relations in principle.

What is claimed is:

1. A radiation heating device that radiates radiant heat, the radiation heating device comprising:
    a heat generation layer having a planar shape;
    a heat generation portion arranged in the heat generation layer to generate heat by energization;
    a plurality of heat radiation portions disposed in the heat generation layer to radiate heat transferred from the heat generation portion;
    a low heat conduction portion arranged around each of the heat radiation portions and having a heat conductivity lower than that of the heat radiation portions;
    a contact detection unit that detects contact of an object with the heat generation layer; and
    an energization amount decrease unit that decreases an energization amount of the heat generation portion when the contact detection unit detects the contact of the object with the heat generation layer.

2. The radiation heating device according to claim 1, further comprising:
    a temperature detection unit that detects a temperature change of the heat generation layer, wherein
    the contact detection unit detects a temperature drop of the heat generation layer, the temperature drop being detected by the temperature detection unit, as the contact of the object with the heat generation layer.

3. The radiation heating device according to claim 2, wherein
    the temperature detection unit is arranged in a layered member that covers a predetermined area of the heat generation layer having the planar shape, and detects a temperature change in the area.

4. The radiation heating device according to claim 2, wherein:
    the temperature detection unit is arranged in a layered member that covers a predetermined area of the heat generation layer having the planar shape, and detects local abnormal heat generation in the area; and
    the radiation heating device further comprises an energization suspension unit that suspends energization of the heat generation portion when the temperature detection unit detects local abnormal heat generation in at least a portion of the heat generation layer.

5. The radiation heating device according to claim 1, wherein:
    the contact detection unit detects contact of the object with the heat generation layer for a certain time period or more; and
    the energization amount decrease unit further decreases the energization amount of the heat generation portion when the contact detection unit detects the contact of the object with the heat generation layer for the certain time period or more.

6. The radiation heating device according to claim 2, wherein the temperature detection unit comprises a positive temperature characteristic member having a positive temperature characteristic.

7. The radiation heating device according to claim 6, wherein:
the positive temperature characteristic member has a thin plate shape; and
the temperature detection unit has two electrode plates that sandwich the positive temperature characteristic member from both sides of the positive temperature characteristic member.

8. The radiation heating device according to claim 6, wherein:
the positive temperature characteristic member comprises a PTC characteristic member passing through an insulating layer and divided into a plurality of areas; and
the temperature detection unit includes:
a first electrode layer disposed on one face side of the insulating layer, the first electrode layer having a linear electrode that is in contact with the PTC characteristic member on the one face side of the insulating layer; and
a second electrode layer disposed on the other face side of the insulating layer, the second electrode layer having a linear electrode that is in contact with the positive temperature characteristic member on the other face side of the insulating layer.

9. The radiation heating device according to claim 6, wherein:
the positive temperature characteristic member comprises a PTC characteristic member formed on one face side of an insulating layer to be divided into a plurality of areas; and
the temperature detection unit includes an electrode layer stacked on the insulating layer, the electrode layer having two electrodes that are formed on a face on the insulating layer side and that are connected to each other via the PTC characteristic member formed on the insulating layer.

10. The radiation heating device according to claim 2, wherein
the temperature detection unit comprises a negative temperature characteristic member having a negative temperature characteristic.

11. The radiation heating device according to claim 10, wherein
the negative temperature characteristic member is a CTR characteristic member having a CTR characteristic.

12. The radiation heating device according to claim 1, further comprising:
a heat generation layer temperature detection unit arranged in the heat generation layer to detect a temperature of the heat generation layer, wherein
the contact detection unit determines that the contact of the object with the heat generation layer is absent, until temperature detected by the heat generation layer temperature detection unit becomes predetermined temperature or more, from start of the energization.

13. The radiation heating device according to claim 1, wherein
the contact detection unit determines that the contact of the object with the heat generation layer is absent until a certain time elapses from start of the energization.

14. The radiation heating device according to claim 1, further comprising:
an energization amount increase unit that increases the energization amount of the heat generation portion after an elapse of a predetermined time, when the energization amount decrease unit decreases the energization amount of the heat generation portion; and
a contact redetermination unit that re-determines the contact of the object with the heat generation layer, after the energization amount increase unit increases the energization amount of the heat generation portion, wherein
the energization amount decrease unit decreases the energization amount of the heat generation portion, when the contact redetermination unit determines the contact of the object with the heat generation layer is present.

15. The radiation heating device according to claim 14, further comprising:
an energization amount return unit that returns the energization amount of the heat generation portion to an original energization amount, when the contact redetermination unit determines that no object contacts the heat generation layer.

* * * * *